United States Patent
Handa et al.

(10) Patent No.: US 8,014,237 B2
(45) Date of Patent: Sep. 6, 2011

(54) DISK DEVICE

(75) Inventors: Hiroto Handa, Tokyo (JP); Akira Takahashi, Nagoya (JP)

(73) Assignee: Clarion Co., Ltd., Tokyo (JP)

( * ) Notice: Subject to any disclaimer, the term of this patent is extended or adjusted under 35 U.S.C. 154(b) by 1119 days.

(21) Appl. No.: 10/594,860

(22) PCT Filed: Mar. 31, 2005

(86) PCT No.: PCT/JP2005/006381
§ 371 (c)(1), (2), (4) Date: May 16, 2007

(87) PCT Pub. No.: WO2005/096296
PCT Pub. Date: Oct. 13, 2005

(65) Prior Publication Data
US 2008/0019227 A1    Jan. 24, 2008

(30) Foreign Application Priority Data

Mar. 31, 2004  (JP) ................. 2004-107720
Mar. 31, 2004  (JP) ................. 2004-107755
Mar. 31, 2004  (JP) ................. 2004-107812
Mar. 31, 2004  (JP) ................. 2004-107865

(51) Int. Cl.
*G11B 15/60*    (2006.01)
(52) U.S. Cl. ............. 369/30.81; 369/30.82; 720/614
(58) Field of Classification Search ............... 369/30.79, 369/30.81, 30.82; 720/605, 608, 614–615, 720/690, 706, 713
See application file for complete search history.

(56) References Cited

U.S. PATENT DOCUMENTS

| 6,002,662 | A | 12/1999 | Watanabe et al. |
|---|---|---|---|
| 6,185,164 | B1 | 2/2001 | Takemasa et al. |
| 6,188,664 | B1 | 2/2001 | Nakayama |
| 6,262,952 | B1 | 7/2001 | Takai |
| 6,744,704 | B1 | 6/2004 | Funaya et al. |
| 6,751,181 | B1 * | 6/2004 | Watanabe et al. ........... 369/192.1 |
| 6,832,382 | B2 | 12/2004 | Ito et al. |
| 2001/0040856 | A1 * | 11/2001 | Watanabe et al. ............. 369/192 |
| 2002/0036976 | A1 * | 3/2002 | Michimori et al. ........... 369/192 |

FOREIGN PATENT DOCUMENTS

| EP | 0 833 324 | 4/1998 |
|---|---|---|
| EP | 0 977 198 | 2/2000 |
| EP | 1 005 039 | 5/2000 |
| JP | 5-55349 | 7/1993 |
| JP | 06-333317 | 12/1994 |
| JP | 08-306114 | 11/1996 |
| JP | 10-199116 | 7/1998 |
| JP | 11-110863 | 4/1999 |

(Continued)

*Primary Examiner* — Daniell L Negron
*Assistant Examiner* — Carlos E Garcia

(57) ABSTRACT

To provide a disk device, which can reliably lead and house a disk into a disk housing section requiring only a small space. The disk device is provided with: a pick arm 130 which swings and inserts a drive unit for playing a disk D into a space created by splitting a plurality of trays 250; and a loading arm 256 which can move between a leading position for abutting on the disk D inserted/ejected with respect to the tray 250 and leading the disk D, and a withdrawing position for withdrawing from the disk to be played. A pick swing cam plate 138, which controls the drive of the pick arm 130 and the loading arm 256, is provided so as to be slidingly moved by a drive mechanism.

15 Claims, 24 Drawing Sheets

FOREIGN PATENT DOCUMENTS

| | | |
|---|---|---|
| JP | 11-110883 | 4/1999 |
| JP | 11-232753 | 8/1999 |
| JP | 11-306637 | 11/1999 |
| JP | 2000-195134 | 7/2000 |
| JP | 2002-32950 | 1/2002 |
| WO | 97/20314 | 6/1997 |

* cited by examiner (A)　　　　　　　　　(B)

FIG.11
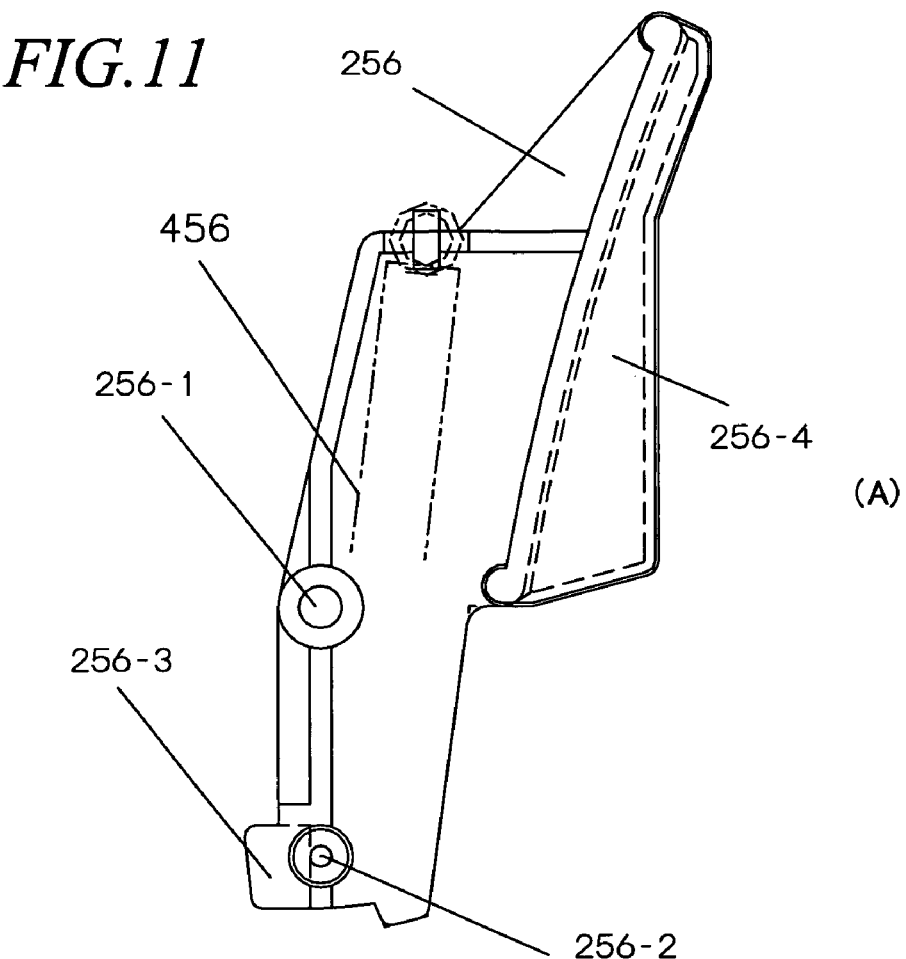
(A)
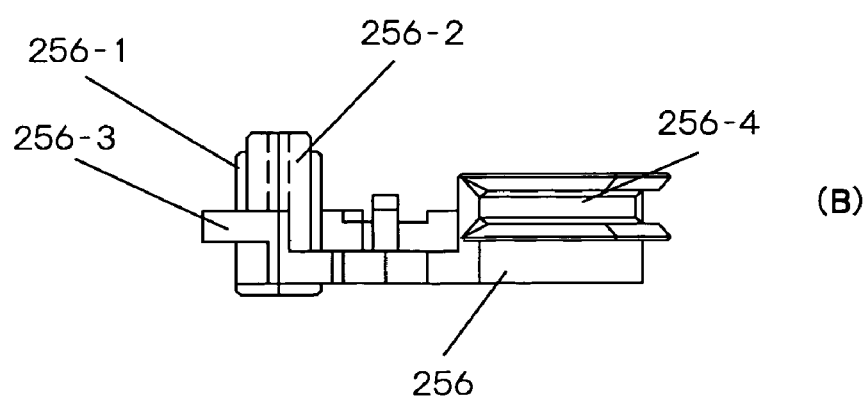
(B)

FIG.13
(A)
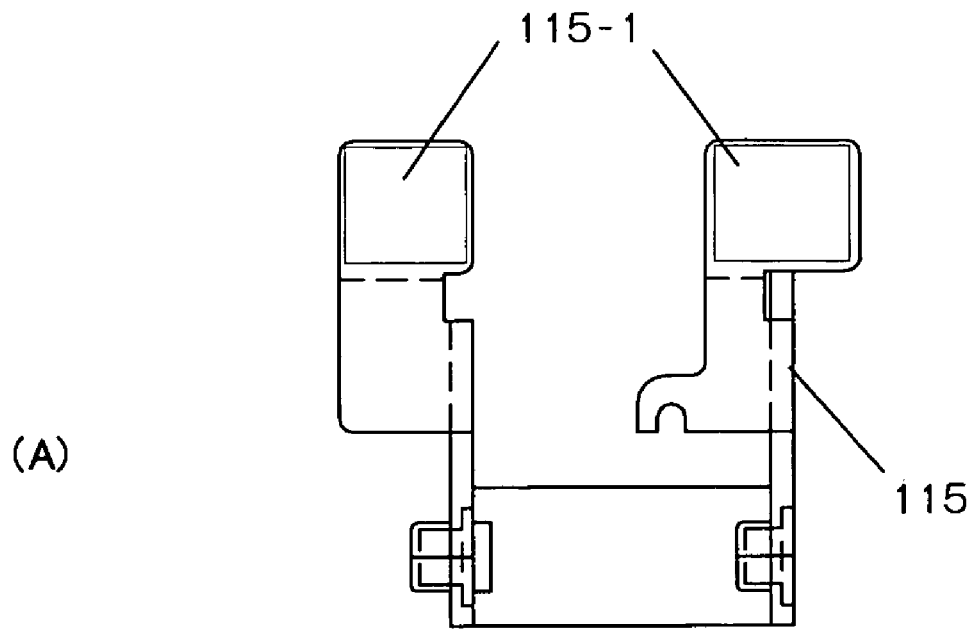
(B)
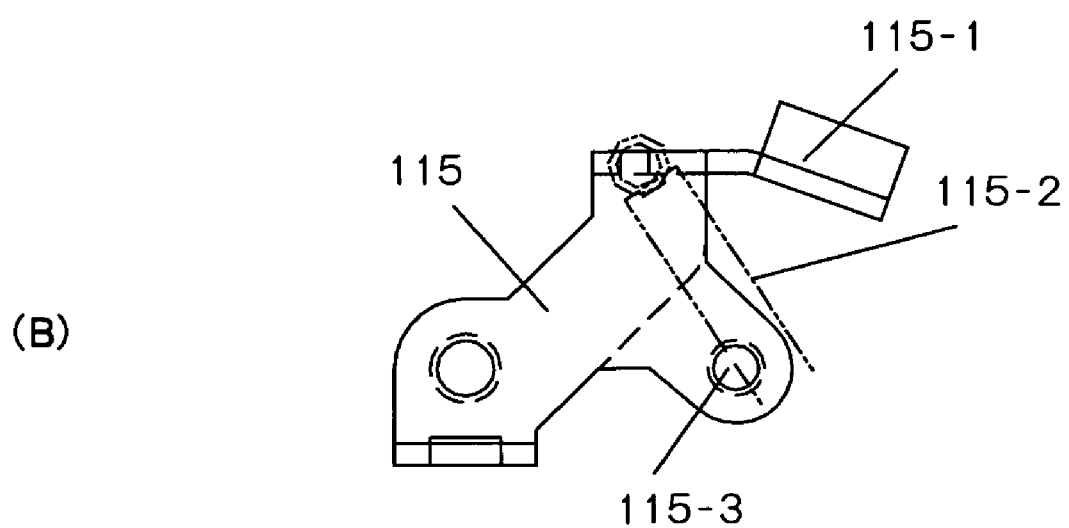

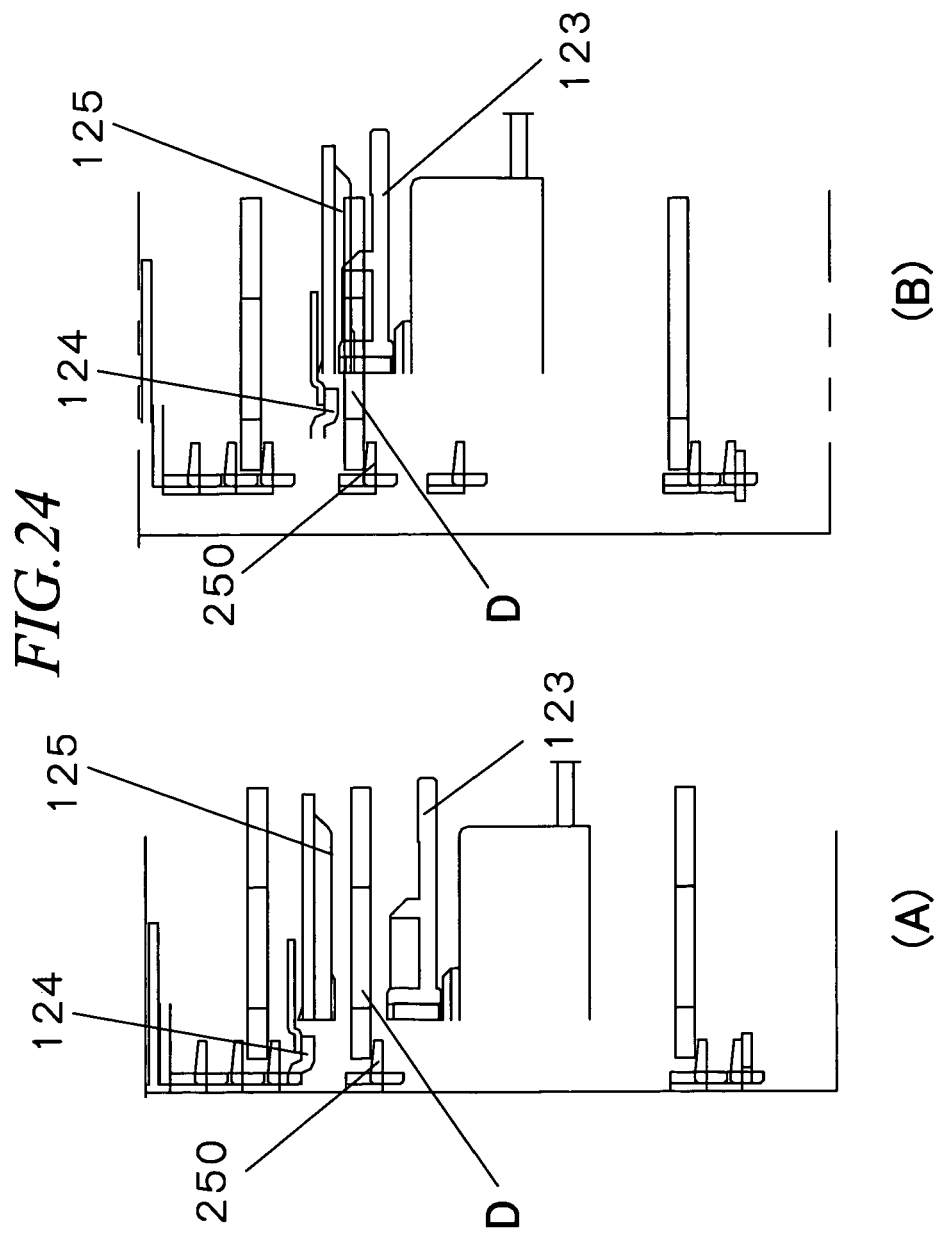

DISK DEVICE

TECHNICAL FIELD

The present invention relates to the improvement of a disk device, which splits disk housing sections housing a plurality of disks therein and moves a drive unit playing a disk to a space formed between the split disk housing sections, to play a disk.

BACKGROUND ART

Conventionally, there has been widely used a disk device which is installed with a magazine for housing disks and in which a disk taken out from the magazine is automatically played. Such a disk device is excellent in operability since the disks do not have to be inserted or ejected one by one every time when playing the disk.

However, it is required that the magazine attached or detached with respect to the device be strong enough to protect a plurality of disks held therein when taking out the magazine to the outside. Therefore, the walls of the magazine main body are thick, and as a result the sizes of the magazine itself and the entire device for installing the magazine are large. Moreover, in order to take out a tray or the like holding the disks inside the magazine, a guiding groove and a rail section are provided on an inner face of a side wall of the magazine. By forming such a groove and rail section, the thickness of the magazine side wall further increases and the gap between each adjacent disk holder becomes wide, whereby the height of the magazine increases and the size of the device for installing the magazine also increases.

In addition, in order to take out a disk housed in the magazine and play the disk, it is necessary to provide a sufficient space in the device, thus the size of the device increases. Particularly, as in an on-board disk device or the like, in the case where a disk needs to be housed in a size of 180×50 (mm), which is called "DIN size", or a size of 180×100 (mm), which is called "double DIN size", small-size disk devices are highly demanded.

In order to deal with such demand, a disk device is developed in which a magazine is split, and a drive unit for playing a disk is provided in a space formed by splitting the magazine, so that the disk can be played without taking out the disk from the magazine (see Japanese Patent Application Laid-Open No. H11-232753, Japanese Patent Application Laid-Open No. H11-306637). Such disk device does not require a space for taking out and play a disk, thus the size of the entire device can be made small.

Furthermore, there is proposed a disk device, in which a detachable magazine is not used but disk housing sections such as trays capable of housing a plurality of disks therein are previously incorporated in the device in a stacked fashion, a disk inserted from a disk insertion opening is automatically housed in the tray, and the housed disk can be automatically ejected. In such a disk device, an opening, a mechanism and the like coping with the thickness of the magazine or attachment of the magazine are not required, thus a small-size device can be realized. Particularly, in the invention disclosed in Japanese Patent Application Laid-Open No. 2000-195134, trays are provided vertically so that they can be split as with the abovementioned split magazine, and a drive unit is inserted into the split tray, whereby a disk can be played without taking it out. Accordingly, further reduction in size of the device can be achieved.

Incidentally, in such an on-board disk device as described above, the disk, which is inserted from the disk insertion opening, needs to be housed reliably in the disk housing section such as a tray, and the disk ejected from the disk housing section needs to be moved reliably to the disk insertion opening. However, for example, in the case of a small-size disk device in which a disk inserted from the disk insertion opening is caused to pass through between a turning table of a drive unit and a clamper and is then housed in the disk housing section, the pathway for movement of the disk between the disk insertion opening and the disk housing section does not necessarily form a straight line. In order to deal with such problem, the course of the disk can be changed by causing the disk to abut on a guide member or the like which is fixed in the disk device. However, if the member for holding the disk on the disk housing section side is comparatively firm, the disk needs to be pushed in against this member, thus change of the course of the disk may not be enough to deal with this case.

Furthermore, in the light of the resistance to vibration, in the above on-board disk device, the disk needs to be reliably housed and held in the tray which configures the disk housing section. Therefore, the tray is usually provided with a member for holding the disk, but when the trays move up and down in order to be split from one another, the disk may come out easily, thus the member in the tray may not be sufficient for holding the disk. At this moment, however, the disk held in the tray also moves due to the up-and-down movement of the tray, thus it is difficult to directly contact with the disk to prevent it from coming out of the tray.

Therefore, in the light of the resistance to vibration, the disk needs to be reliably housed and held in the tray which configures the disk housing section. On the other hand, when playing or conveying the disk, the disk needs to be released smoothly from the tray. In order to balance securing with releasing of the disk and configure a device having high resistance to vibration, it is necessary to provide not only a member for holding a disk on the tray but also a plurality of members around the tray to guide a disk to the tray and prevent the disk from coming out from the tray. However, since the space around the disk is narrow, it is not easy to dispose these members without interrupting the movement of the disk. Particularly, when configuring these members movably with respect to the disk so that the members contact with or separate from the disk when necessary, a drive mechanism for driving each member is required, thus a wider space is required and the members and the disk need to be synchronized with each other.

DISCLOSURE OF THE INVENTION

The present invention is, therefore, contrived in order to resolve the above problems of the conventional technology, and an object of the present invention is to provide a disk device which is capable of reliably guiding and housing disks into disk housing sections in a small required space.

In order to achieve the abovementioned object, the present invention is a disk device, comprising: a swing arm which is provided with a drive unit for playing a disk and swung to insert the drive unit into a space created by splitting disk housing sections capable of housing a plurality of disks; a drive mechanism for driving the swing arm; a loading arm which is capable of being displaced between a leading position for abutting on a disk moving between a disk insertion position and the disk housing sections and leading the disk to the disk housing section side or the disk insertion position, and a withdrawing position for withdrawing from the disk; and a control member which transmits drive power of the drive mechanism to the swing arm, and is provided with loading arm driving means for driving, in accordance with the position thereof, the loading arm to the leading position or the withdrawing position.

In the present invention described above, the disk, which moves from the disk insertion position, abuts on the loading arm and changes the direction to the disk housing section side. At this moment, the disk is led by the loading arm, which is displaced to the leading position, to the disk housing section side and thus can be housed reliably in the disk housing section.

Moreover, when playing the disk the loading arm is displaced to the withdrawing position, thus it does not collide with the disk. Furthermore, since the loading arm is driven by the control member for driving the swing arm, the mechanism can be simplified.

In another embodiment, the disk device is provided with a biasing member for biasing the loading arm to the leading position.

In the abovementioned embodiment, since the loading arm is biased to the leading position by the biasing member, the disk is pushed into the disk housing section more strongly or pushed out to the disk insertion position.

In another embodiment, the control member is a single plate provided so as to be able to slidingly move, and the loading arm driving means comprises a plurality of cams provided integrally on the control member.

In the abovementioned embodiment, since driving of the plurality of members can be controlled by the cams formed integrally on the single plate, the number of members can be saved, and the transfer pathway for the drive power can be simplified, thus failures and the like hardly occur in the operation of the disk device.

In another embodiment, the disk device has a regulating arm which is capable of being displaced between a regulating position, which is disposed between the disk housed in the disk housing section and the disk insertion position so as not to contact with the disk, and the withdrawing position for withdrawing from the disk housed in the disk housing section.

In the abovementioned embodiment, when the regulating arm is in the regulating position, the regulating arm is disposed between the disk housed normally in the disk housing section and the disk insertion position in a noncontact fashion. Therefore, even in a case where the disk is displaced from the housing position due to vibration caused when the disk moves along with the tray when splitting the trays, the disk abuts on the regulating arm and thus is prevented from coming out from the disk housing section.

In another embodiment, the disk device is provided with the control member, and a link mechanism which interlocks the control member and the regulating arm.

In the abovementioned embodiment, the link mechanism can displace the regulating arm as well in accordance with displacement of the control member for driving the swing arm, thus the mechanism can be simplified and a required space can be saved more, compared to the case where members for driving the respective components are disposed.

In another embodiment, the link mechanism has a slide link which is provided so as to be able to slidingly move, and the slide link is provided with a pressing section which presses the regulating arm to the withdrawing position at both ends of the movement direction of the slide link.

In the abovementioned embodiment, even when slidingly moving the slide link to either direction, the regulating arm is positioned at the withdrawing position in the end of the direction. Therefore, in a case where the control member is moved in the opposite direction when playing and inserting/ejecting the disk, the regulating arm can be interlocked with the control member and withdrawn.

In another embodiment, the regulating arm comprises a rod-like regulating section which stands upright in the vicinity of the disk when located at the regulating position and falls over when located at the withdrawing position.

In the abovementioned embodiment, since the rod-like regulating section is caused to stand upside down, only a small space is necessary and the disk can be prevented from coming out, and even when the regulating section abuts on the displaced disk at the regulating position, a recording surface is prevented from damage.

In another embodiment, the disk device further comprises a tension arm which is capable of being displaced between an abutting position for abutting on an edge of any of the disks other than the disks played or inserted/ejected, and a withdrawing position for separating from the disk.

In the abovementioned embodiment, the disk can be reliably prevented from coming out in any circumstances by combining the regulating arm, which prevents the disk from coming out in a noncontact fashion, and a tension arm, which contacts with or separates from the disk to prevent it from coming out.

In another embodiment, the disk device further comprises a link mechanism which places the tension arm at the withdrawing position when the regulating arm is located at the regulating position, and places the tension arm at the regulating position when the regulating arm is located at the withdrawing position.

In the abovementioned embodiment, when the tray and the disk are moved upward when splitting the disk housing sections, the regulating arm is located at the regulating position and the tension arm is located at the withdrawing position, thus the upward movement of the disk can be permitted and at the same time the disk can be prevented from coming out of the disk housing section. When playing or inserting/ejecting the disk, the regulating arm is located at the withdrawing position and the tension arm is located at the abutting position, thus the disks other than the one to be played or inserted/ejected can be prevented from coming out of the disk housing sections.

In another embodiment, a control member, which transmits drive power of the drive mechanism to the swing arm and drives the link mechanism, is provided.

In the abovementioned embodiment, the control member which drives the swing arm can drive the link mechanism as well, thus the number of members can be reduced and the configuration of the disk device can be simplified.

In another embodiment, the link mechanism has a slide link which is provided so as to be able to slidingly move, and the slide link is provided with a pressing section which presses the regulating arm to the withdrawing position at both ends of the movement direction of the slide link, and is provided also with a biasing section which biases the tension arm to the regulating position.

In the abovementioned embodiment, even when slidingly moving the slide link to either direction, the regulating arm can be positioned at the withdrawing position in the end of the direction and the tension arm can be positioned at the regulating position, thus the configuration of the disk device can be made extremely simple and the both regulating arm and the tension arm can be driven.

In another embodiment, the disk device comprises: a disk regulating section which is provided so as to be displaceable between a regulating position for regulating displacement of a disk housed in the disk housing section and a withdrawing position for withdrawing from the disk housed in the disk housing section; and a control member, which comprises loading arm biasing means provided so as to be displaced by the drive mechanism and for biasing, in accordance with the position thereof, the loading arm to the leading position or the withdrawing position, and regulating section biasing means for biasing the disk regulating section to the regulating position or the withdrawing position.

In the abovementioned embodiment, since the control member, which is displaced by the drive mechanism, can appropriately drive the loading arm and the disk regulating section, the mechanism around the disk housing section can be made extremely simple and a required space can be saved more, compared to the case where members for driving the respective components are disposed.

In another embodiment, the disk regulating section comprises: a regulating arm which is capable of being displaced between a regulating position, which is disposed between a disk housed in the disk housing section and the disk insertion position, and a withdrawing position for withdrawing from the disk housed in the disk housing section; a tension arm which is capable of being displaced between an abutting position for abutting on any of disks housed in the disk housing sections and the withdrawing position for separating from the disks; and a link mechanism, which is provided so as to be driven by the regulating section biasing means, and interlocks the switching between the regulating position and the withdrawing position of the regulating arm, and the switching between the abutting position and the withdrawing position of the tension arm.

In the abovementioned embodiment, not only the loading arm but also the two types of members, i.e. the regulating arm and the tension arm for regulating the displacement of the disk, can be driven in accordance with the displacement of the control member, thus the mechanism can be made simpler and a required space can be saved more, compared to the case where members for driving the respective components are disposed.

In another embodiment, the control member is a single plate provided so as to be able to slidingly move.

In the abovementioned embodiment, the single plate is slidingly moved, whereby driving of the plurality of members can be controlled, thus the number of members can be saved significantly.

In another embodiment, each of the loading arm biasing means and the regulating section biasing means comprises a plurality of cams provided integrally on the control member.

In the abovementioned embodiment, since driving of the plurality of members can be controlled by the cams formed integrally on the single plate, the number of members can be further saved, and the transfer pathway for the drive power can be simplified, thus failures and the like hardly occur in the operation of the disk device.

According to the present invention described above, a disk device, which can reliably lead and house a disk into a disk housing section with only a small space required, can be provided.

BRIEF DESCRIPTION OF THE DRAWINGS

FIG. 11A is a plan view showing a loading arm of the disk device shown in FIG. 1;

FIG. 11B is a front view showing the loading arm of the disk device shown in FIG. 1;

FIG. 13A is a rear side view showing the tension arm of the disk device shown in FIG. 1;

FIG. 13B is a plan view showing the tension arm of the disk device shown in FIG. 1;

FIG. 24A is an explanatory diagram showing a state in which a clamper of the disk device shown in FIG. 1 is swung; and FIG. 24B is an explanatory diagram showing a state in which the disk is clamped in the disk device shown in FIG. 1.

BEST MODE FOR CARRYING OUT THE INVENTION

Figure 1:
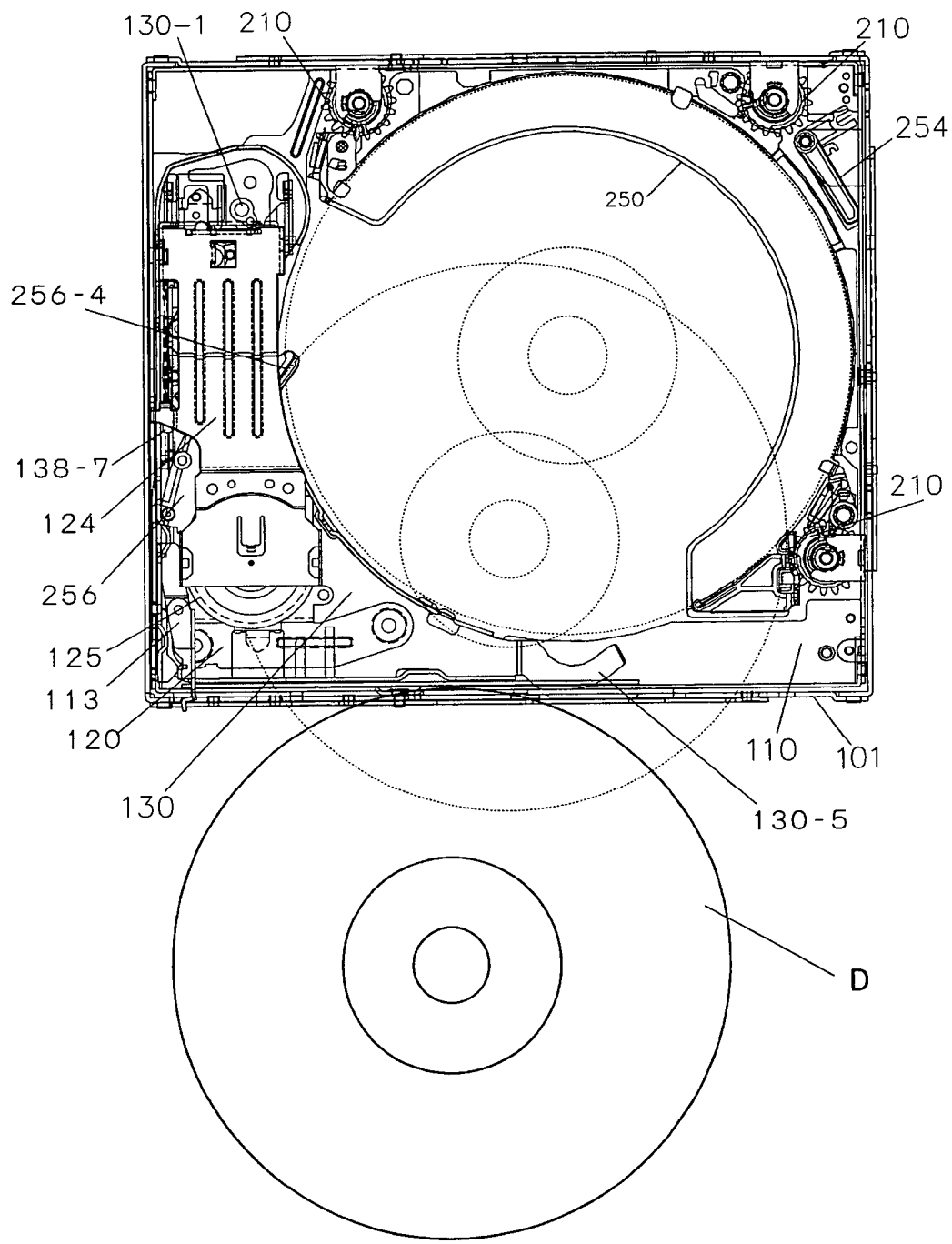
FIG. 1 is a plan view showing an embodiment of the disk device of the present invention.

Hereinafter, an embodiment ("present embodiment", hereinafter) of an on-board disk device to which the present invention is applied is described in detail with reference to the drawings. It should be noted that, in the following descriptions of the drawings, the front face side of the disk device is the head side, the back face side of same is the rear side, and the vertical and longitudinal directions correspond to the directions viewed from the front face side of the disk device.

A. Entire Configuration

The present embodiment has the following schematic configurations as shown in FIG. 1, FIG. 2, FIG. 8, and FIG. 9:

(1) A pick chassis 110, in which trays 250 capable of holding disks D are stacked and which can move up and down in a chassis 101.

(2) A pick arm 130 which is swung to be inserted between split trays 250 (corresponding to the swing arm described in the claims).

(3) A drive chassis 120 which is provided on the pick arm 130 and comprises a drive unit (having a turning table 123 and the like) playing the disk D.

(4) A pick swing cam plate 138 which drives the pick arm 130 by slidingly moving (corresponding to the control member described in the claims).

(5) A loading arm 256 which is driven by the pick swing cam plate 138 (corresponding to the loading arm described in the claims).

(6) A regulating arm 231 which is provided in the pick chassis 110.

(7) A tension arm 115 which is provided in the pick chassis 110.

(8) A slide link 114 and a link arm 113 which drive the regulating arm 231 and the tension arm 115 respectively (corresponding to the link mechanism described in the claims).

B. Configuration of Each Part

[1. Pick Chassis (FIGS. 1 Through 5)]

The pick chassis 110 is provided so as to be able to move up and down in the chassis 101, and is formed with a substantially fan-shaped gap so as not to interfere with the disk D and the trays 250 by moving up and down. The front and rear faces and the right and left side faces of the pick chassis 110 are bent at a right angle from the bottom face thereof along the inner side faces of the chassis 101. The rear face (FIG. 3), right side face (FIG. 4) and front face (FIG. 5) of the pick chassis 110 are calked by pick elevating pins 110-1, 2, 3 respectively.

These pick elevating pins 110-1, 2, 3 are engaged with vertical pick guide grooves 101-1, 2, 5 formed in the cassis 101. The pick elevating pins 110-1, 2, 3 are engaged with pick elevating cams 108-4, 107-2, 106-2, which are step-like grooves or holes formed respectively on shift plates 108, 107, 106 provided slidably on side faces of the chassis 101. Therefore, by synchronous sliding movement of the shift plates 108, 107, 106, the pick chassis 110 moves up and down, but the mechanism for such configuration is omitted herein.

[2. Pick Arm (FIGS. 1, 2, 6, 7)]

Figure 2:
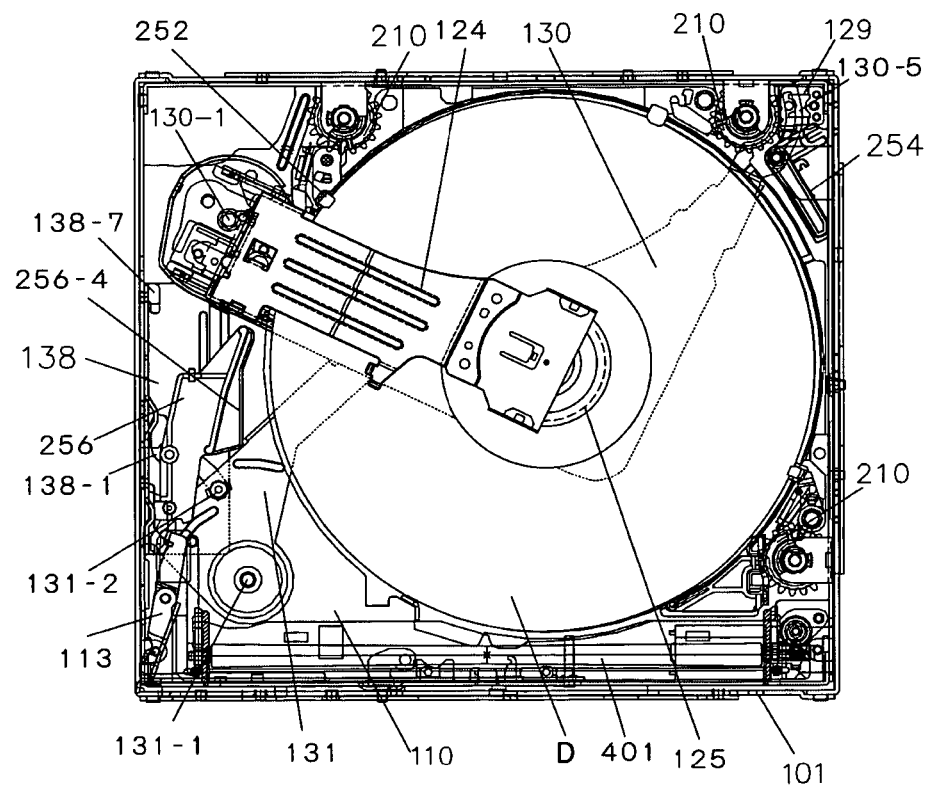
FIG. 2 is a plan view showing a state in which a disk shown in FIG. 1 is housed.
Figure 3:
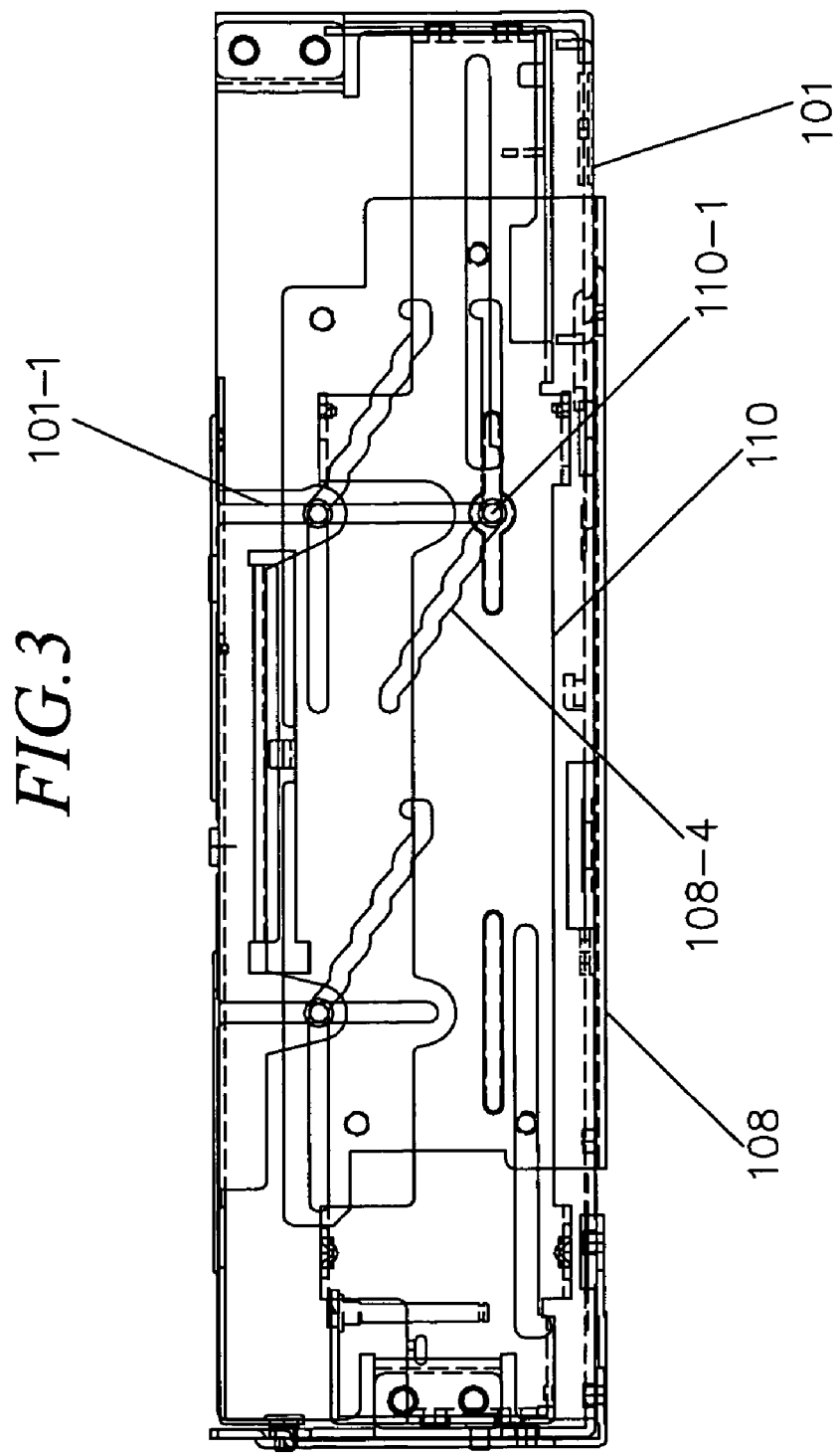
FIG. 3 is a back view showing the chassis and a shift plate of the disk device shown in FIG. 1.
Figure 4:
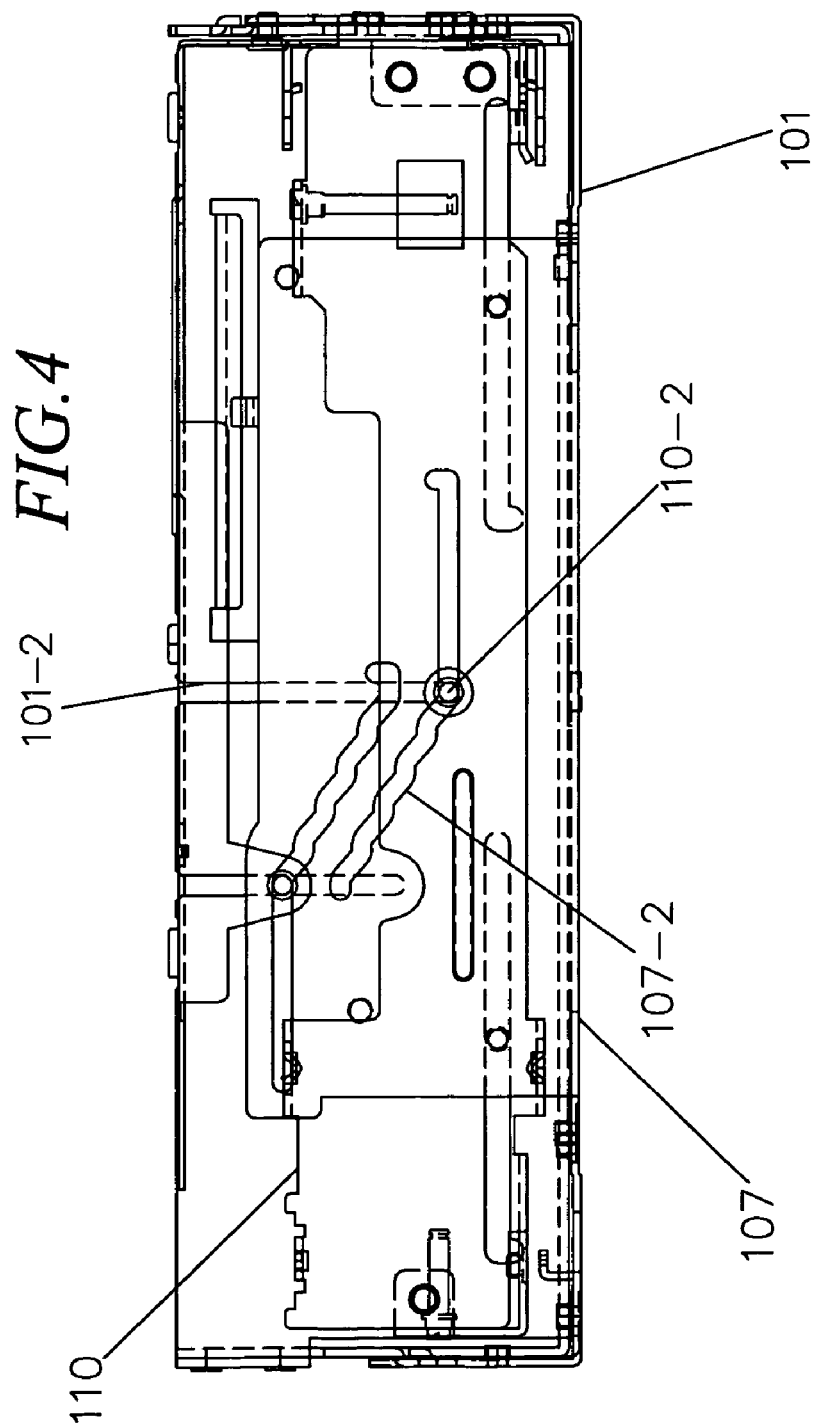
FIG. 4 is a right side view showing the chassis and the shift plate of the disk device shown in FIG. 1.
Figure 5:
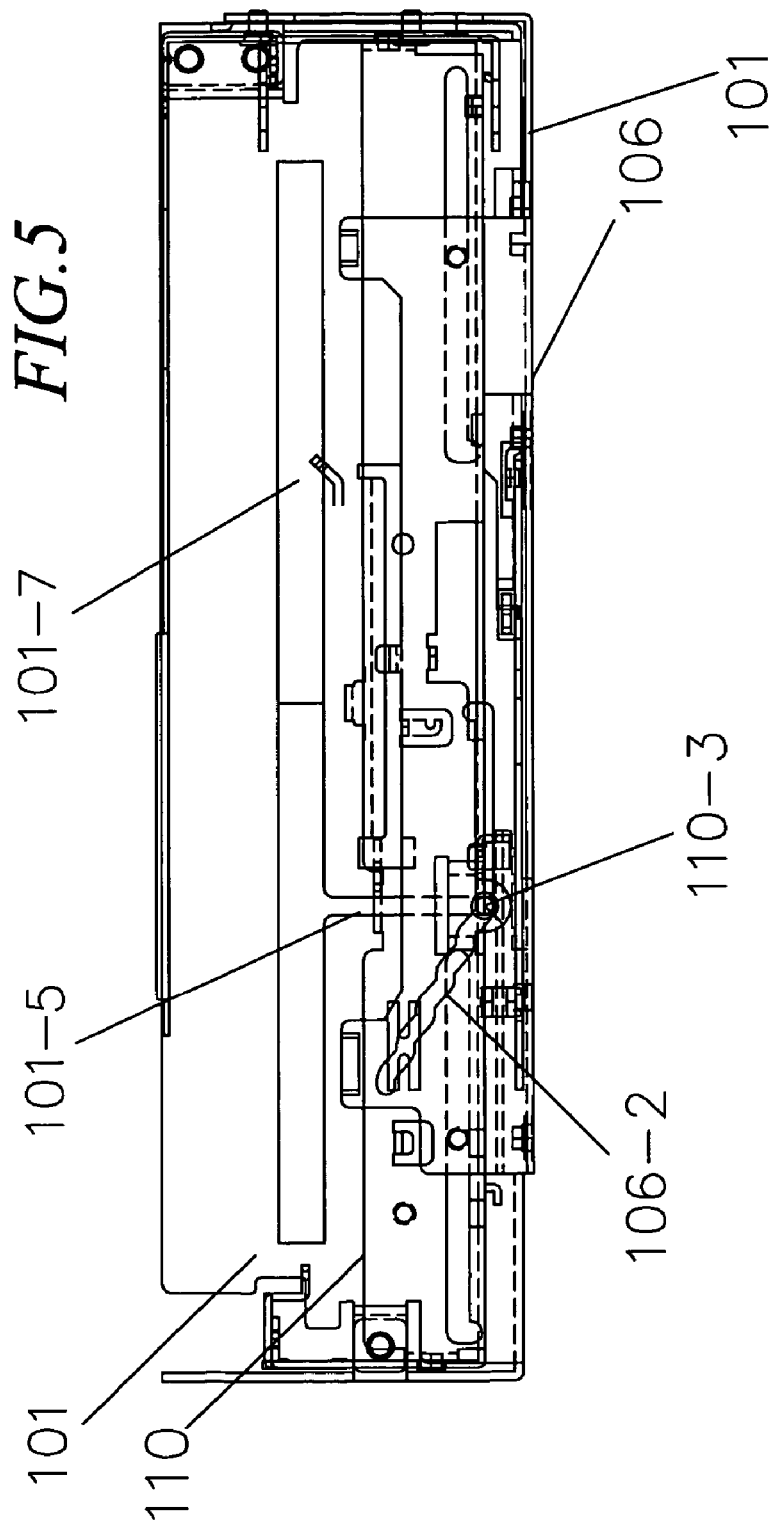
FIG. 5 is a front view showing the chassis and the shift plate of the disk device shown in FIG. 1.

As shown in FIGS. 1 and 2, the pick arm 130 is attached to an upper part of the left bottom face of the pick chassis 110 so as to be able to rotate freely around an axis 130-1 as a spindle. A leading end of the pick arm 130 (opposite end from the axis 130-1) is provided with a hook 130-5. This hook 130-5 is a section held on the rear face side of the pick chassis 110 when the pick arm 130 is swung. Specifically, a holding section 129, which is a pair of plates in the horizontal direction, is fixed on a right rear corner of the pick chassis 110 (see FIG. 20), and the hook 130-5 is held between these plates.

Figure 6:
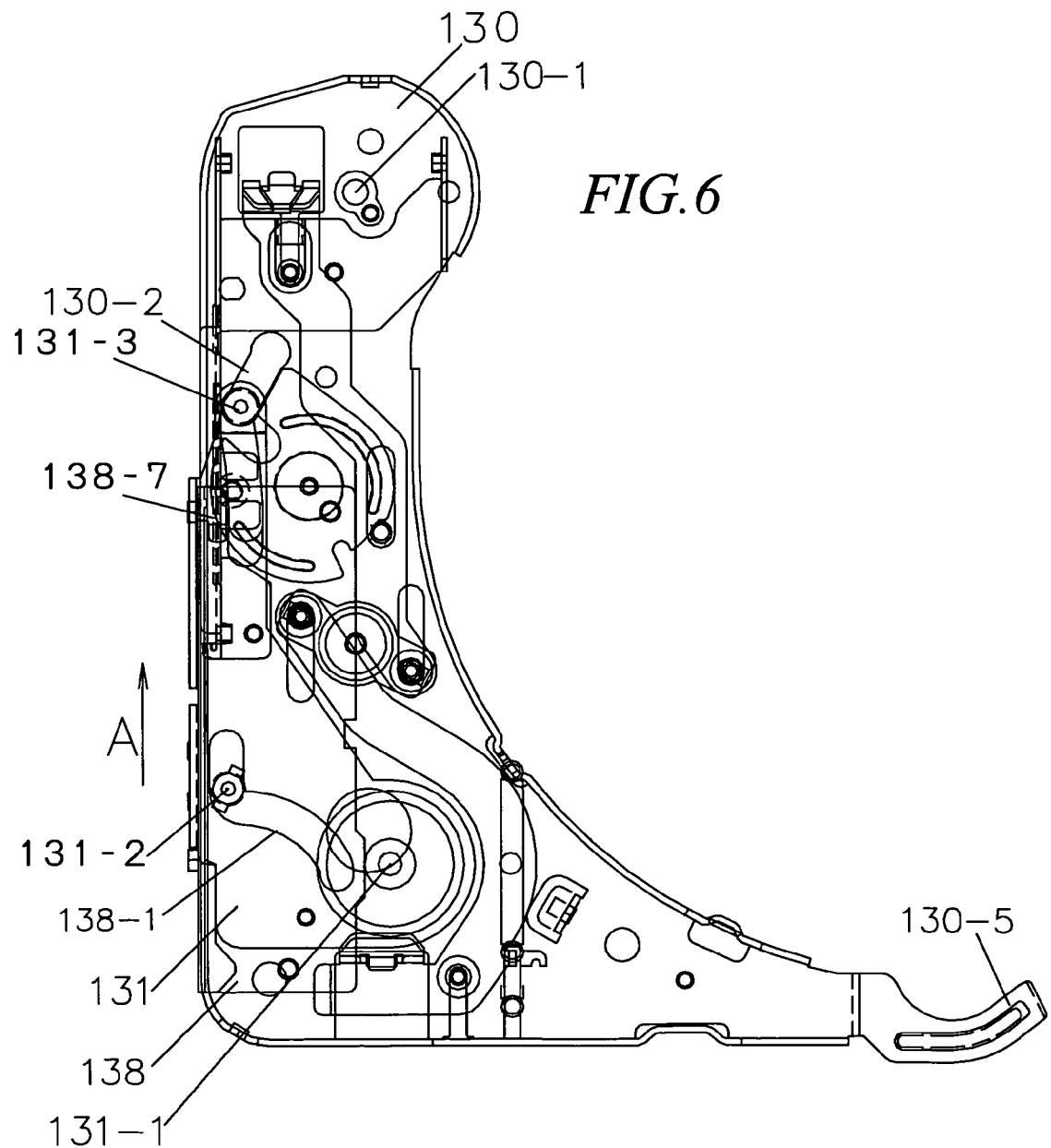
FIG. 6 is a plan view showing a pick arm of the disk device shown in FIG. 1.

Furthermore, on the pick arm 130, there is formed a connecting cam 130-2 which is a groove or a hole to which drive power of a pick swing arm 131 is transmitted, the pick swing arm 131 be described hereinafter (see FIGS. 6, 7). Moreover, the pick arm 130 is provided with a turning table 123, a drive chassis 120 having members required for playing a disk, such as a pick up (not shown), a clamp arm 124 having a clamper 125 and the like for holding the disk D between the turning table 123 and the clamper 125, a floating lock mechanism which switches between a state in which the drive chassis 120 is supported elastically by the pick arm 130 and a state in which the drive chassis 120 is fixed to the pick arm 130, and the like, but detailed explanations for these components are omitted herein.

[3. Pick Swing Arm (FIGS. 2, 6, 7)]

The pick swing arm 131 is disposed between the pick arm 130 and the pick chassis 110 and attached to the pick chassis 110 so as to be rotatable around an axis 131-1 engaged with a hole of the pick chassis 110. A roller 131-2 is rotatably attached to a left reverse face of the axis 131-1 of the pick swing arm 131. This roller 131-2 is inserted into a swinging cam 138-1 of a pick swing cam plate 138, which is described hereinafter. A two-stage roller 131-3 is attached rotatably to a leading end section of the pick swing arm 131. This two-stage roller 131-3 is inserted into the connecting cam 130-2 provided on the pick arm 130.

[4. Pick Swing Cam Plate (FIGS. 6 Through 10)]

Figure 7:
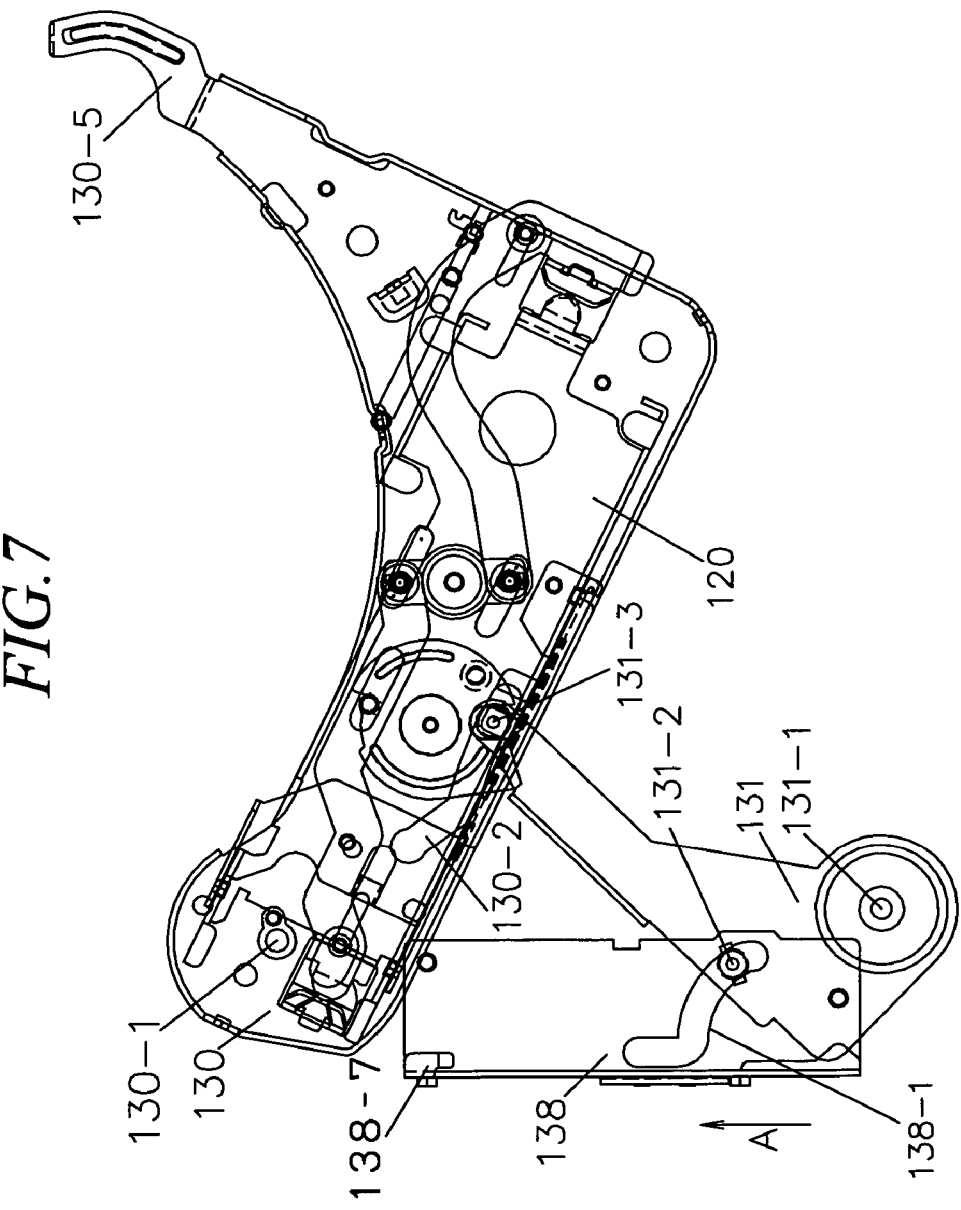
FIG. 7 is a plan view showing a state in which the pick arm shown in FIG. 6 is swung.
Figure 8:
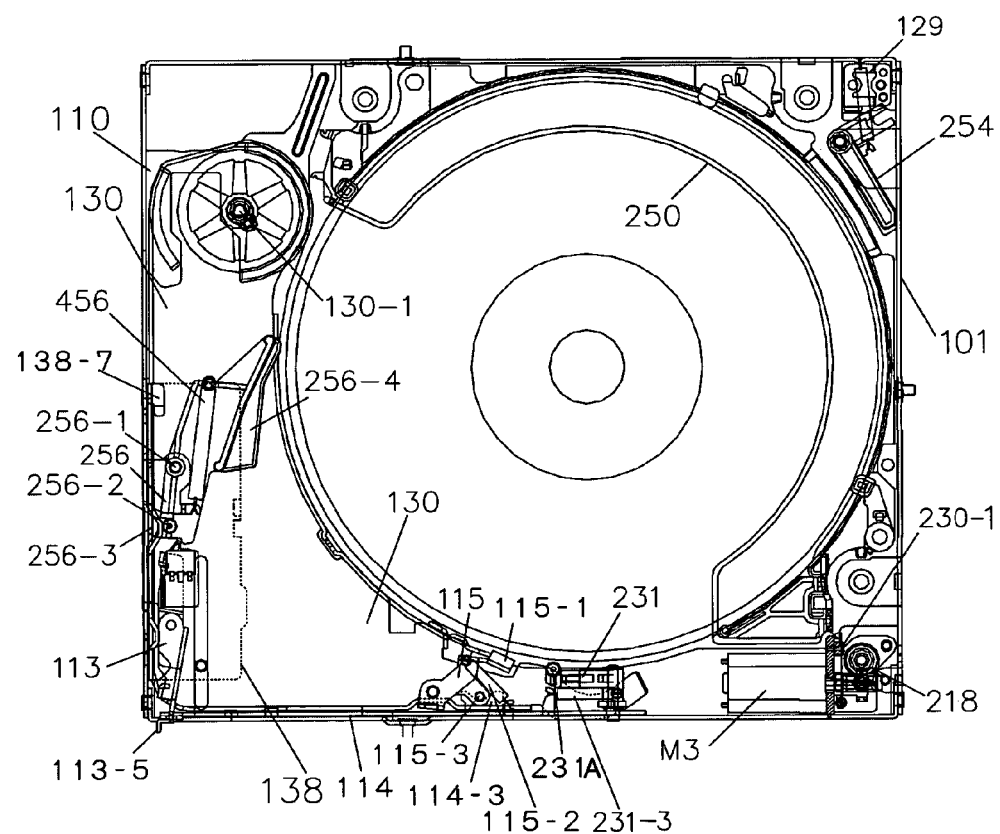
FIG. 8 is a plan view showing a state in which a tension arm of the disk device shown in FIG. 1 is withdrawn.
Figure 9:
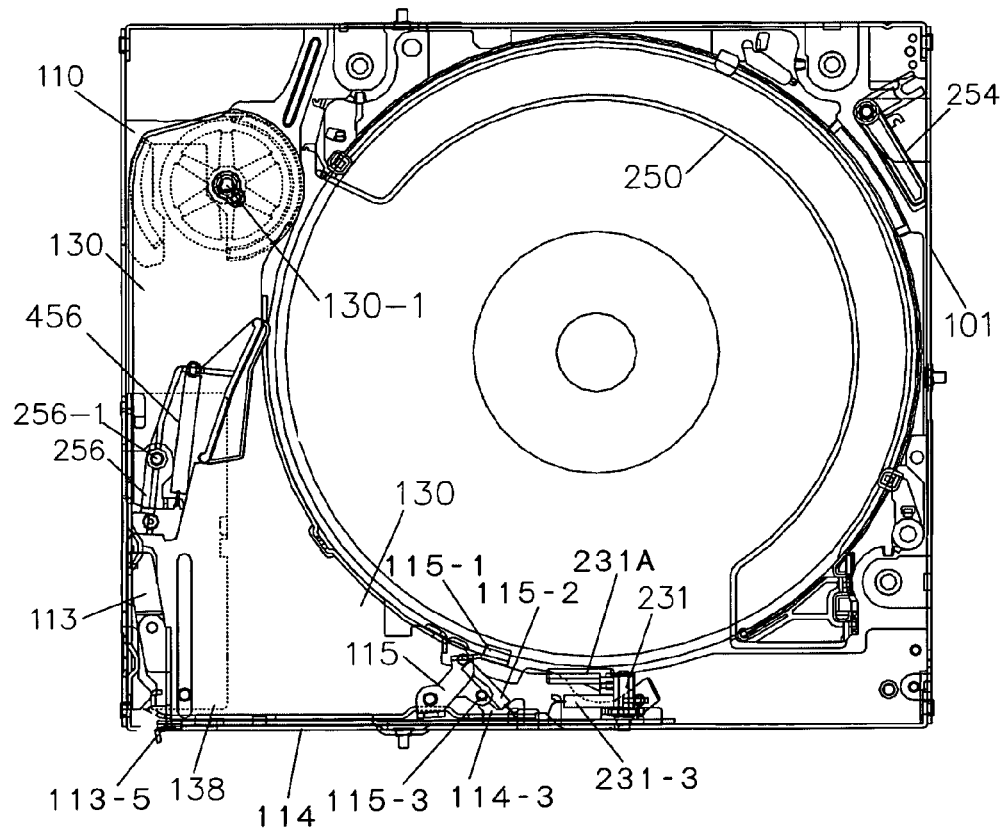
FIG. 9 is a plan view showing a state in which the tension arm of the disk device shown in FIG. 1 holds a disk.

The pick swing cam plate 138 is attached to the reverse face of the pick chassis 110 so as to be able to slidingly move back and forth, as shown in FIG. 8 and FIG. 9. The roller 131-2 of the pick swing arm 131 is inserted into the swinging cam 138-1, which is a groove or a hole formed on the bottom face of the pick swing cam plate 138, as shown in FIG. 6 and FIG. 7, and the rear section of the swinging cam 138-1 is formed straight in an anterior-posterior direction while the front section of same is in the form of an arc. Therefore, when the pick swing cam plate 138 moves backward (direction of A), the pick swing arm 131 rotates clockwise. Then, in accordance with such rotation of the pick swing arm 131, the two-stage roller 131-3 attached to the front part of the pick swing arm 131 biases the pick arm 130 so that the pick arm 130 rotates counterclockwise, while moving inside the connecting cam 130-2 formed on the pick arm 130.

Figure 10:
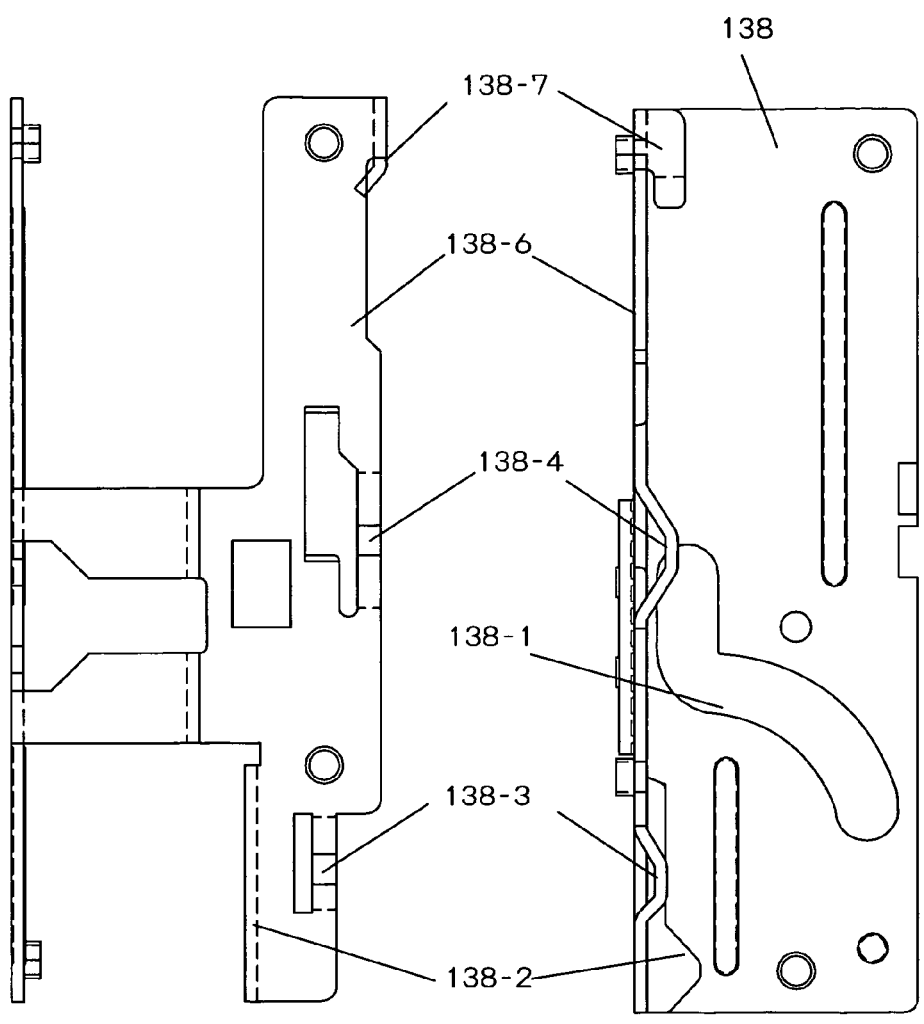
FIG. 10A is a left side view showing a pick swing cam plate of the disk device shown in FIG. 1.
FIG. 10B is a plan view showing the pick swing cam plate of the disk device shown in FIG. 1.

Moreover, as shown in FIG. 10, on the front section of a left side face 138-6, which is formed by bending the left end section of the pick swing cam plate 138 upward, a mountain-shaped cam 138-2 for controlling the rotation of the link arm 113 is integrated so as to protrude inward, the cam 138-2 being described hereinafter. On the front and rear at an upper section of the left side face 138-6 of the pick swing cam plate 138, two restricting sections 138-3, 138-4 for controlling the loading arm 256 are integrated with the pick swing cam plate 138 so as to protrude inward, the restricting sections 138-3, 138-4 being described hereinafter. Further, on an upper end at the back of the left side face 138-6 of the pick swing cam plate 138, there is formed a lifting section 138-7, which is bent inward to form a step. This lifting section 138-7 is, as shown in FIG. 1, lifts up the clamp arm 124 from the bottom and thereby secures a clearance for inserting the disk D.

[5. Loading Arm (FIGS. 2, 8, 9, 11)]

As shown in FIG. 8 and FIG. 9, the loading arm 256 is engaged rotatably with an axis 256-1 calked with an upper left section of the pick chassis 110. The loading arm 256 is biased clockwise by a spring 456 provided between the loading arm 256 and the pick chassis 110. Further, a boss section 256-2 and a protruding section 256-3 are formed in front of the left side of the loading arm 256. The boss section 256-2 and the protruding section 256-3 abut on the inside of the restricting sections 138-3, 138-4 or of the left side face 138-6 in accordance with sliding movement of the pick swing cam plate 138, whereby the rotation angles of the boss section 256-2 and the protruding section 256-3 are set (see FIG. 18). Furthermore, as shown in FIG. 11, on the loading arm 256, there is provided a guide section 256-4 in the form of substantially a reversed C which changes the direction of the disk D when the left edge of the disk D to be inserted/ejected abuts thereon and at the same time passes therethrough (see FIG. 1).

[6. Regulating Arm (FIGS. 8, 9, 12)]

Figure 12:
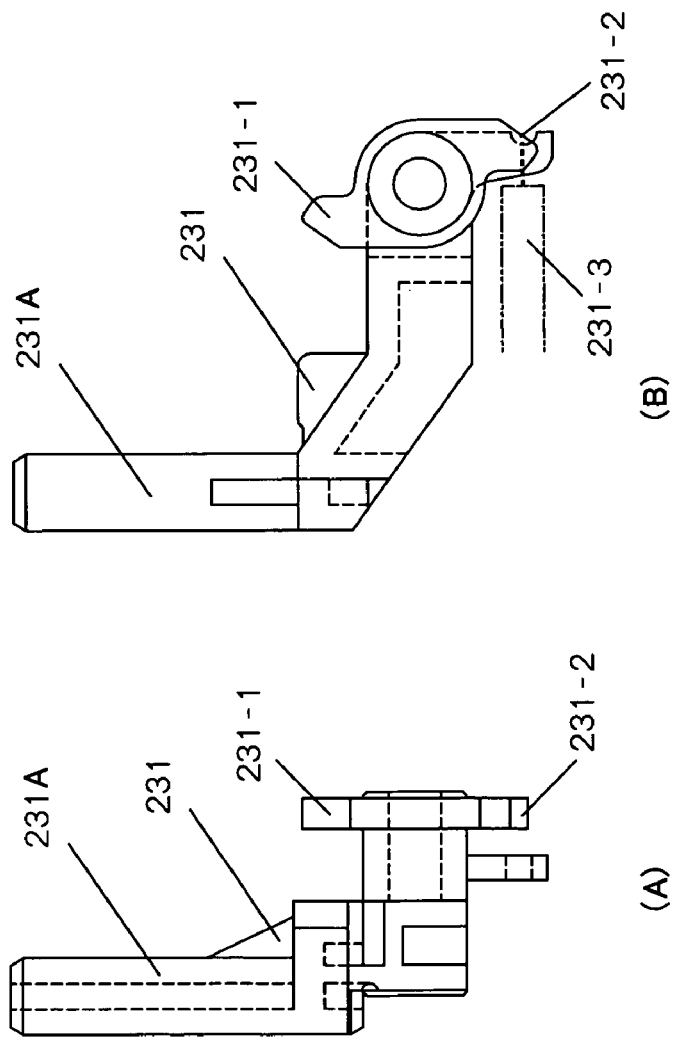
FIG. 12A is a left side view showing a regulating arm of the disk device shown in FIG. 1.
FIG. 12B is a front view showing the regulating arm of the disk device shown in FIG. 1.

As shown in FIG. 8 and FIG. 9, the regulating arm 231 is pivotally supported by the front wall of the pick chassis 110 so as to be rotatable vertically. This regulating arm 231 has a rod-like regulating section 231-A as shown in FIG. 12, and is configured such that switching is performed between a regulating position (FIG. 8) where the regulating section 231-A stands upright in response to the rotation of the regulating arm 231 and slightly stays away from the outer edge of the disk D inside the tray 250 to prevent the disk D to come out of the tray 250, and a withdrawing position (FIG. 9) where the regulating section 231-A falls over and withdraws from the disk D inside the tray 250 to secure a space for moving or playing the disk D. Pressing sections 114-1, 2, which are provided on the slide link 114 described hereinafter, contact with or separate from projecting sections 231-1, 2 provided above and below the axis of the regulating arm 231, whereby the above-described switching is performed. Furthermore, a spring 231-3, which is provided between the regulating arm 231 and the pick chassis 110, biases the regulating arm 231 in the direction where the regulating section 231-A stands upright.

[7. Tension Arm (FIGS. 8, 9, 13)]

As shown in FIG. 8 and FIG. 9, the tension arm 115 is a member pivotally supported on the front section of the bottom face of the pick chassis 110 so as to be able to rotate, and comprises a vertical pair of pads 115-1 which hold an edge of the disk D inside a tray 250 below the tray 250 which is the object of selection, and provides tension to the disk D to prevent the disk D from coming out of the tray 250. This tension arm 115 is biased by a spring 115-2 provided between the tension arm 115 and the pick chassis 110 in the direction in which the pads 115-1 separate from the disk D. Moreover, the tension arm 115 is provided with a pin 115-3 which is biased by a pressing nib 114-3 of the slide link 114 described hereinafter.

[8. Slide Link (FIGS. 8, 9, 14 Through 16)]

Figure 14:
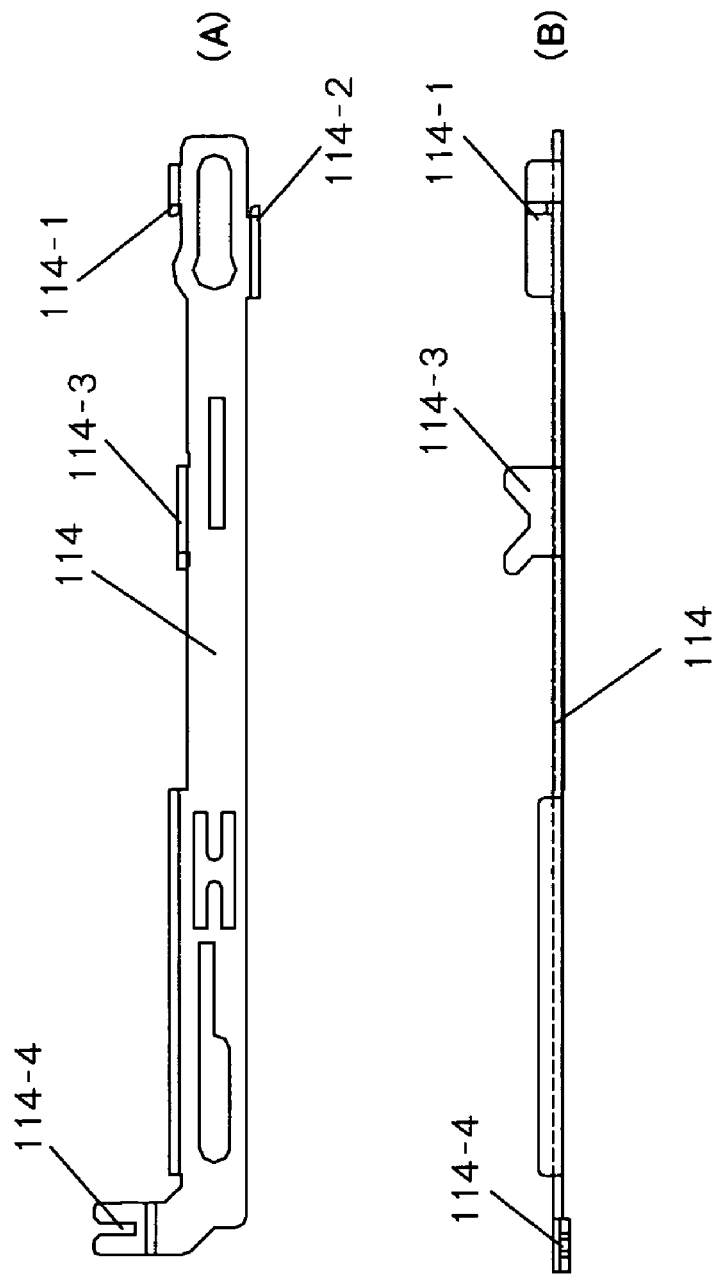
FIG. 14A is a front view showing a slide link of the disk device shown in FIG. 1.
FIG. 14B is a plan view showing the slide link of the disk device shown in FIG. 1.
Figure 15:
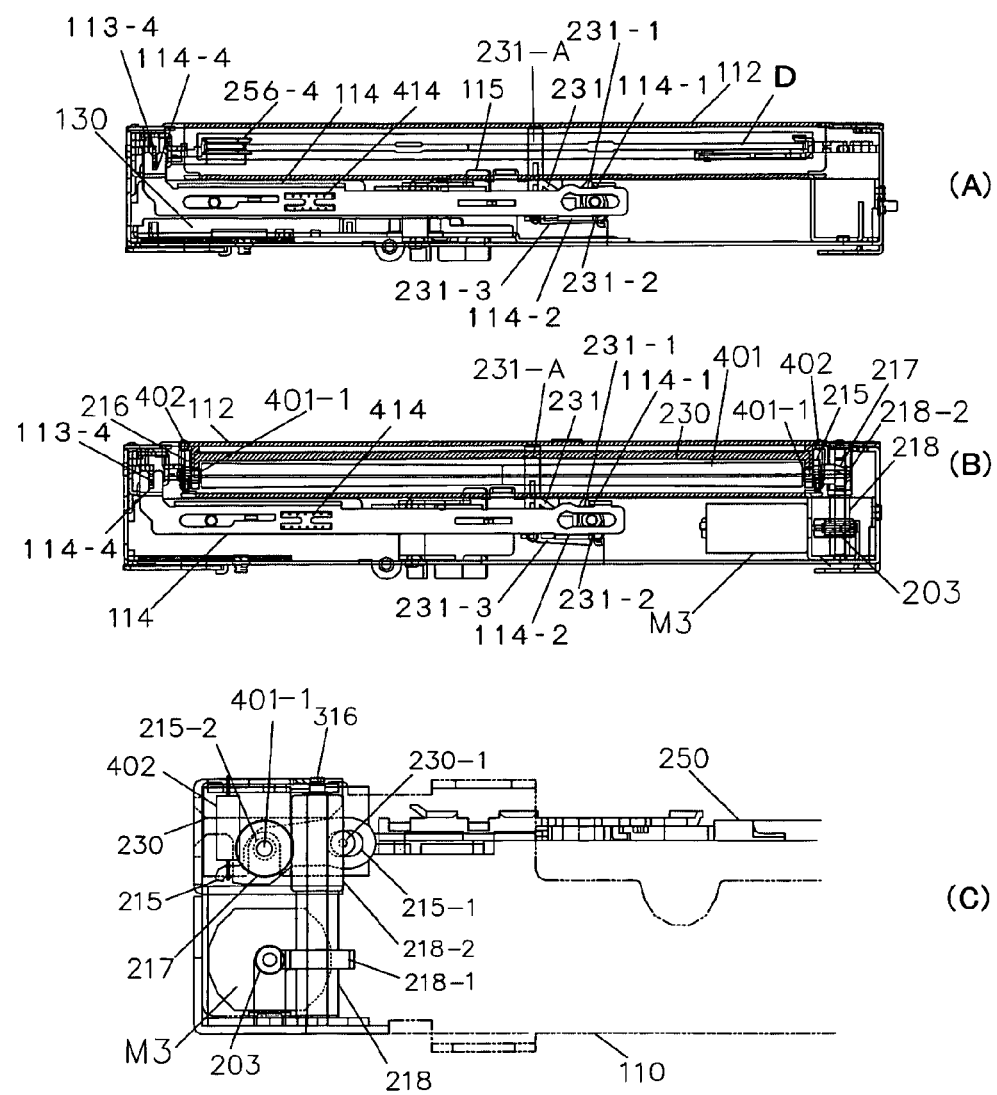
FIG. 15A is a front view showing a housed disk in a state in which the regulating arm of the disk device shown in FIG. 1 rises up.
FIG. 15B is a front view showing a loading roller in a state in which the regulating arm of the disk device shown in FIG. 1 rises up.
FIG. 15C is an enlarged right side view showing a configuration of the loading roller and a disk guide in a state in which the regulating arm of the disk device shown in FIG. 1 rises up.
Figure 16:
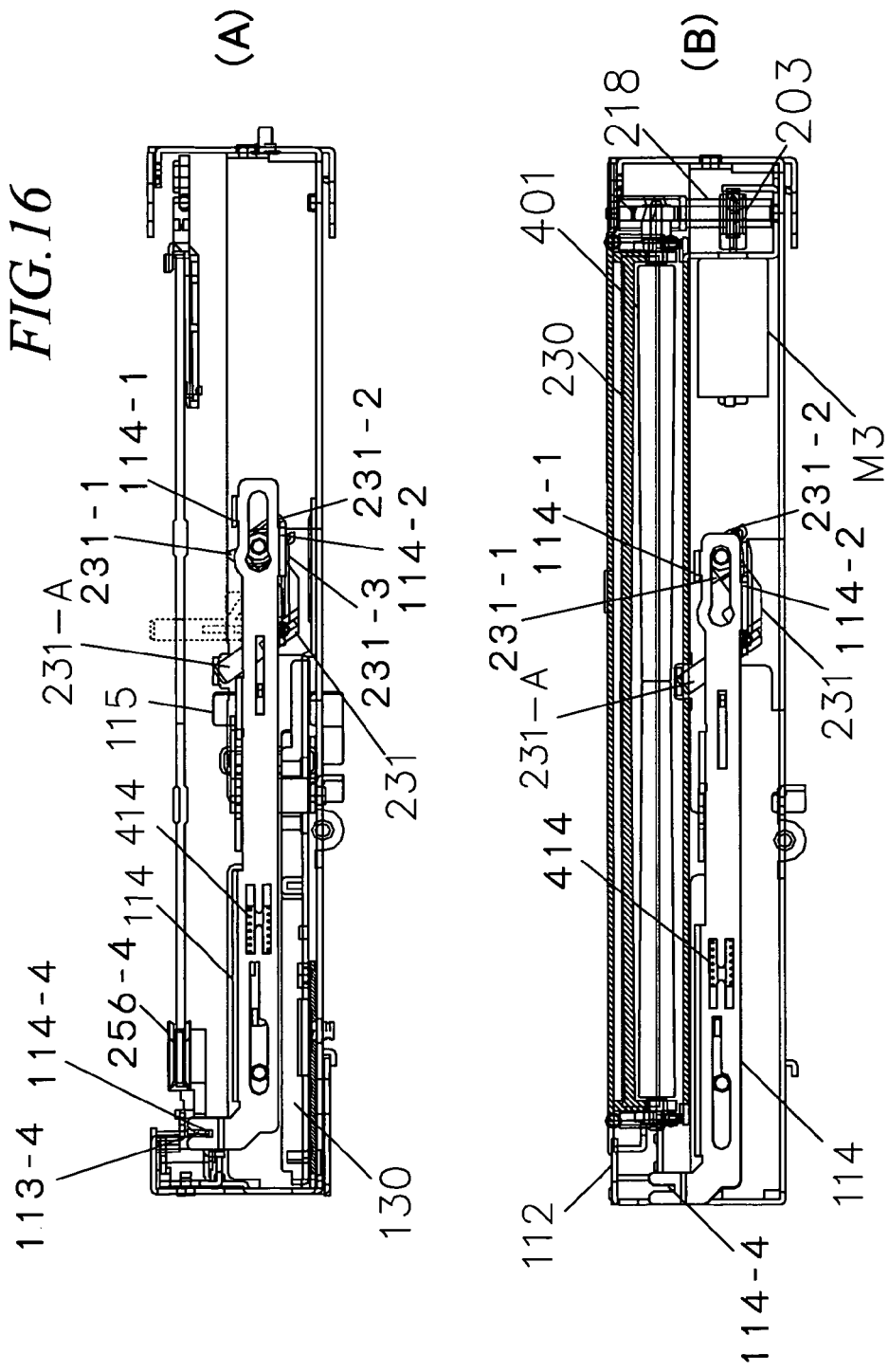
FIG. 16A is a front view showing a state in which the slide link of the disk device shown in FIG. 1 moves to the right.
FIG. 16B is a front view showing a state in which the slide link of the disk device shown in FIG. 1 moves to the left.

As shown in FIG. 14 through FIG. 16, the slide link 114 is a member which is provided on the front wall of the pick chassis 110 so as to be able to slidingly move horizontally. This slide link 114 is biased by a spring 414 disposed between the slide link 114 and the pick chassis 110 so as to stand by at an intermediate position between both ends of the movement direction thereof. The pressing sections 114-1, 2, which press the protruding sections 231-1, 2 of the regulating arm 231 in accordance with the horizontal sliding movement of the slide link 114, are provided in the vicinity of the right end of the slide link 114.

Specifically, as shown in FIG. 16A, when the slide link 114 slidingly moves to the right, the lower protruding section 231-2 is biased by the lower pressing section 114-2 and the regulating arm 231 rotates downward against the bias force of the spring 231-3, thus the regulating section 231-A enters a withdrawing state. On the other hand, as shown in FIG. 16B, when the slide link 114 slidingly moves to the left, the upper protruding section 231-1 is biased by the upper pressing section 114-1 and the regulating arm 231 rotates downward against the bias force of the spring 231-3, thus the regulating section 231-A enters the withdrawing state. In this manner, when the slide link 114 moves to either direction, the regulating section 231-A enters the withdrawing state.

Furthermore, as shown in FIG. 8, FIG. 9, FIG. 14, the inside of the slide link 114 is provided with the pressing nib 114-3 which biases the pin 115-3 of the tension arm 115 in accordance with the horizontal sliding movement of the slide link 114, and thereby rotates the tension arm 115 against the spring 115-2 toward the back to cause the pad 115-1 to contact with the outer edge of the disk D. This pressing nib 114-3 has a smooth cam face which is substantially concave, biases the pin 115-3 at the protruding sections on both ends, and releases the bias of the pin 115-3 in a dent at the center. Further, the left end of the slide link 114 is provided with a groove 114-4 which is engaged with a leading end section 113-4 of the link arm 113, which is described hereinafter.

[9. Link Arm (FIGS. 8, 9, 17, 18)]

Figure 17:
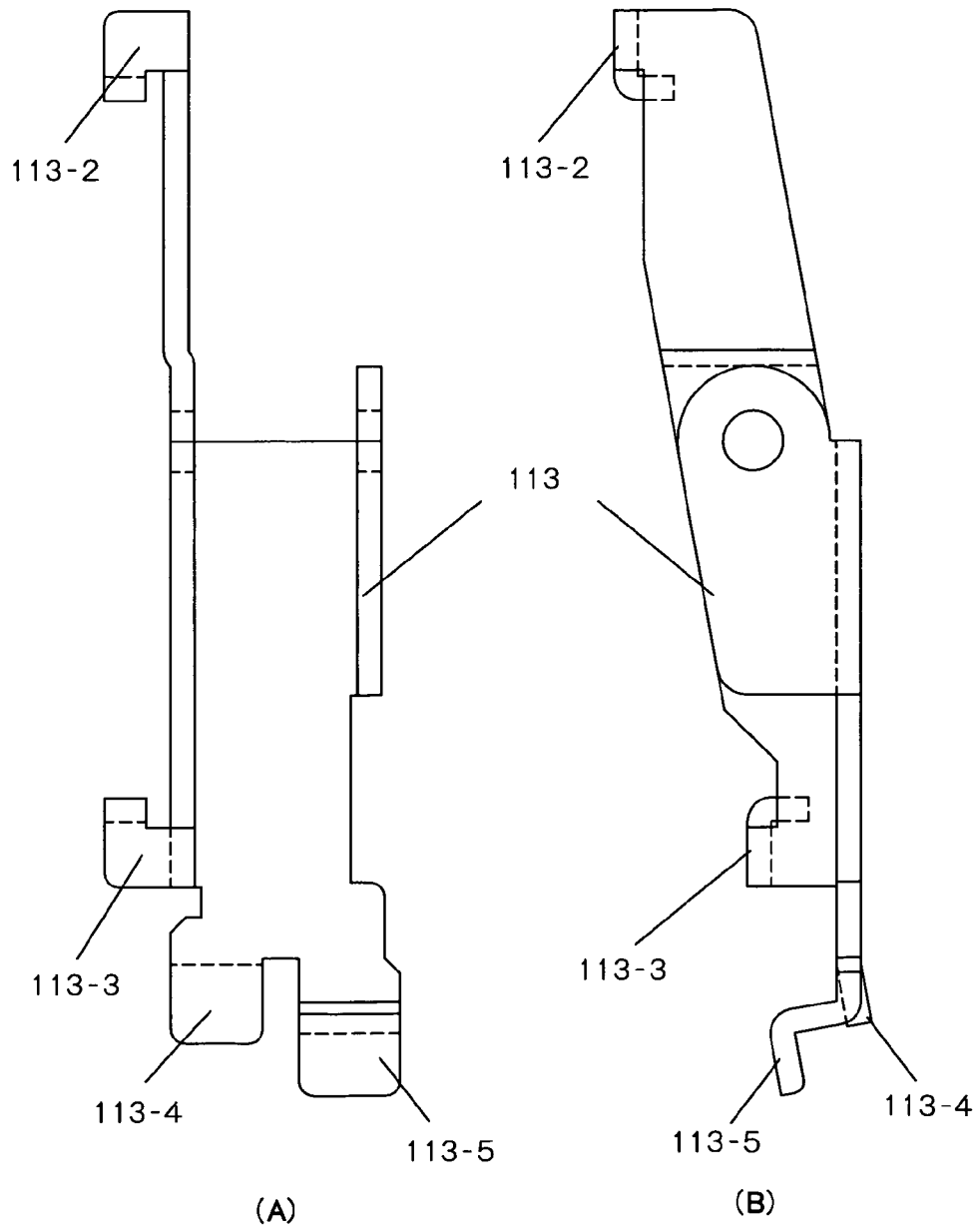
FIG. 17A is a left side view showing a link arm of the disk device shown in FIG. 1.
FIG. 17B is a plan view showing the link arm of the disk device shown in FIG. 1.
Figure 18:
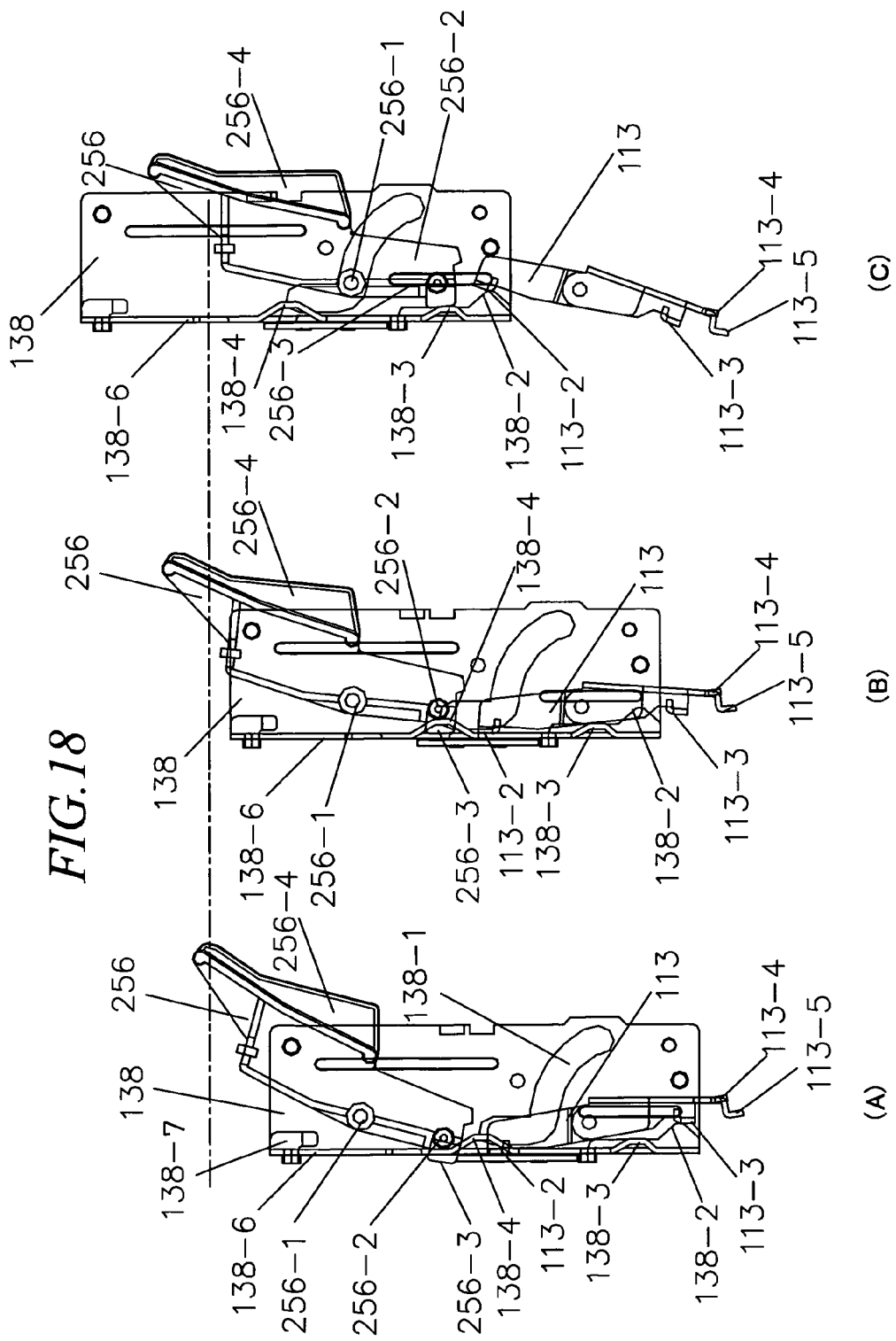
FIG. 18A is a side view showing a change in the angles of the loading arm and the link arm in accordance with the position of the pick swing arm of the disk device shown in FIG. 1.
FIGS. 18B and 18C are plan views each showing a change in the angles of the loading arm and the link arm in accordance with the position of the pick swing arm of the disk device shown in FIG. 1.

As shown in FIG. 8, FIG. 9, FIG. 17, the link arm 113 is attached so as to be rotatable on an axis calked with a disk guide plate 112 described hereinafter, wherein two bent sections 113-2, 3 are formed at front and back of the left side of the lower face which is formed in the form of substantially a reversed C. As shown in FIG. 18, these bent sections 113-2, 113-3 contact with or separate from the cam 138-2 formed on the pick swing cam plate 138 which slidingly moves, thereby slidingly move the link arm 113 to the left or right. Moreover, as described above, a leading end section 113-4 of the link arm 113 is engaged with the groove 114-4 of the slide link 114. Therefore, when the pick swing cam plate 138 slidingly moves back and forth, the link arm 113 rotates and the slide link 114 slidingly moves to the right or left. In addition, the leading end section 113-4 of the link arm 113 is provided with a biasing section 113-5 which biases a shutter 103 describe hereinafter.

[10. Disk Guide and Loading Roller (FIGS. 2, 15, 16)]

As shown in FIG. 15B, FIG. 15C, and FIG. 16B, an upper front section of the pick chassis 110 is provided with a disk guide plate 112 in the form of substantially a reversed C, and the disk guide 230 is incorporated inside of the disk guide plate 112. A groove, which guides an edge of the disk D when the disk D is inserted or ejected, is formed in the disk guide 230. Axis sections 230-1 are integrally formed on the right and left of the disk guide 230, and these right and left axis sections 230-1 are engaged with an elongated hole 215-1 (the drawing for the left side is omitted) of roller bearings 215, 216, as shown in FIG. 15C. A bearing section 215-2 (the drawing for the left side is omitted) for receiving a roller axis 401-1 protruding from the right and left of the loading roller 401 is formed in a central section of each of the roller bearings 215, 216. Furthermore, a spring 402 is attached to a space between a leading end section of each of the roller bearings 216, 215 and an upper section of the disk guide plate 112. Therefore, when the disk D is inserted between the loading roller 401 and the disk guide 230, the loading roller 401 drops by the amount of the thickness of the disk D and the roller bearings 215, 216 rotate downward, but bias force of the spring 402 constantly applies pressure to the loading roller 401 in an upward direction so that the loading roller 401 is pressure-bonded to the disk D.

In a lower section on the right side of the disk guide plate 112, a motor M3 is attached, and a worm 203, which is pressed into an axis of the motor M3, is engaged with a helical gear 218-1 of a helical worm 281 in which the helical gear 218-1 and a worm gear 218-2 are integrally formed. The helical worm 218 is rotatably attached to an axis 316 which is provided upright on the disk guide plate 112. The worm gear 218-2, which is formed in an upper section of the helical worm 218, is engaged with a helical gear 217 which is pressed into the axis of the loading roller 401. Accordingly, the loading roller 401 is rotated in accordance with an operation of the motor M3.

[11. Shutter (FIG. 19)]

Figure 19:
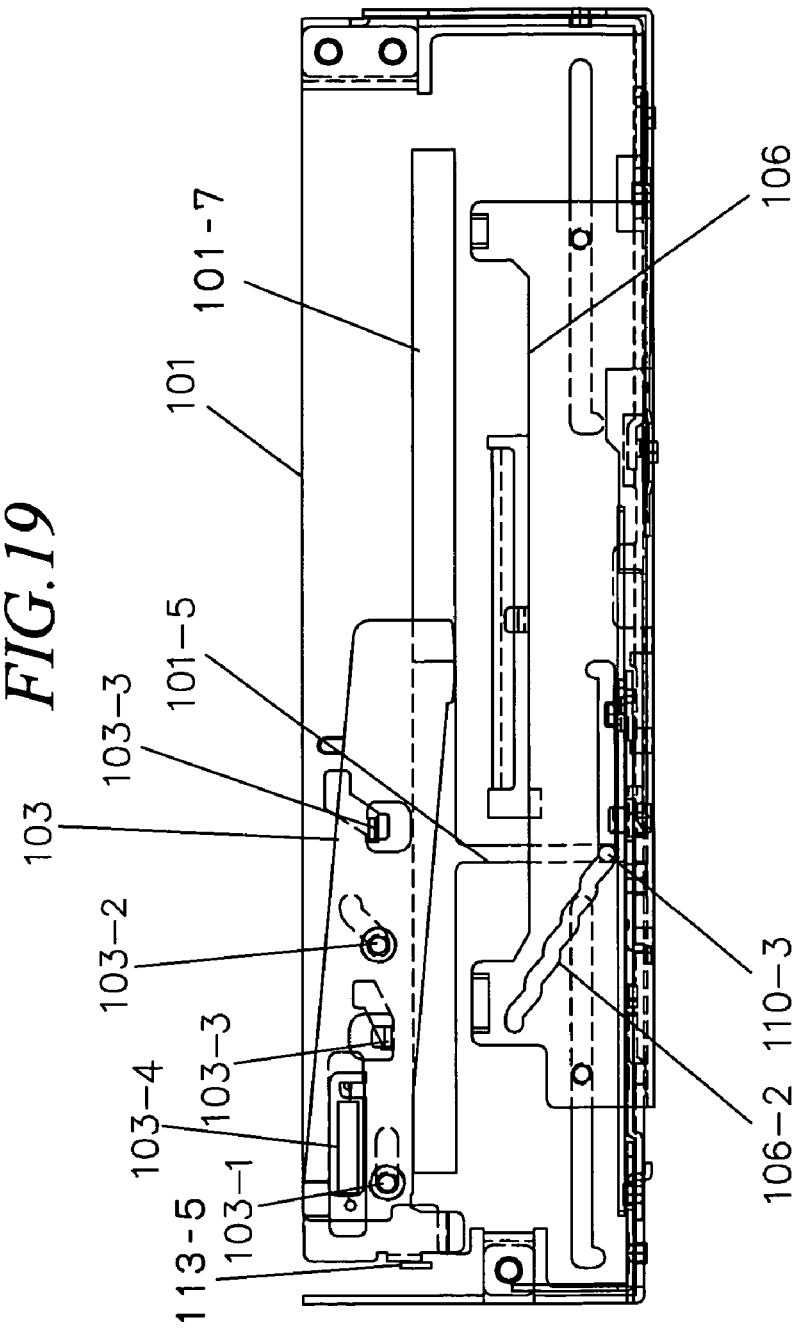
FIG. 19 is a front view showing a shutter which opens and closes a disk insertion opening of the disk device shown in FIG. 1.

As shown in FIG. 19, a disk insertion opening 101-7 for inserting/ejecting the disk D is formed on a front face of the chassis 101, and this disk insertion opening 101-7 is provided with a shutter 103 for preventing an erroneous insertion of the disk D. This shutter 103 is provided with an axis 103-1, a pin 103-2, and two curved sections 103-3, and the axis 103-1 is inserted into a horizontal groove formed on the chassis 101 so as to be rotatable and movable in the horizontal direction. The pin 103-2 and the two curved sections 103-3 are inserted into the groove so as to be able to move along a groove formed on the chassis 101 in a diagonal direction. The shutter 103 is biased by a spring 103-4 provided between the shutter 103 and the chassis 101, in a direction of closing the disk insertion opening 101-7.

Further, the biasing section 113-5 of the link arm 113 abuts on a left end of the shutter 103. Therefore, when the shutter 103 is biased to the right by the biasing section 113-5 in accordance with the rotation of the link arm 113, the shutter 103 rotates around the axis 103-1 while moving to the right against the bias force of the spring 103-4, and opens the disk insertion opening 101-7.

[12. Tray (FIGS. 1, 2, 20)]

Various known technologies can be applied to the trays 250 in which the disks D are housed and which are split when playing a disk D. For example, it is considered that the trays 250 can be provided as arc-like plates which are stacked on the pick chassis 110 and capable of moving up and down, a rotating drum cam 210 is disposed upright on the periphery of the tray 250 as shown in FIG. 1 and FIG. 2, and nib sections which are provided on an edge of the tray 250 are inserted in a step-like groove formed on the periphery of the drum cam 210, whereby the tray 250 moves up and down in accordance with the rotation of the drum cam 210.

Figure 20:
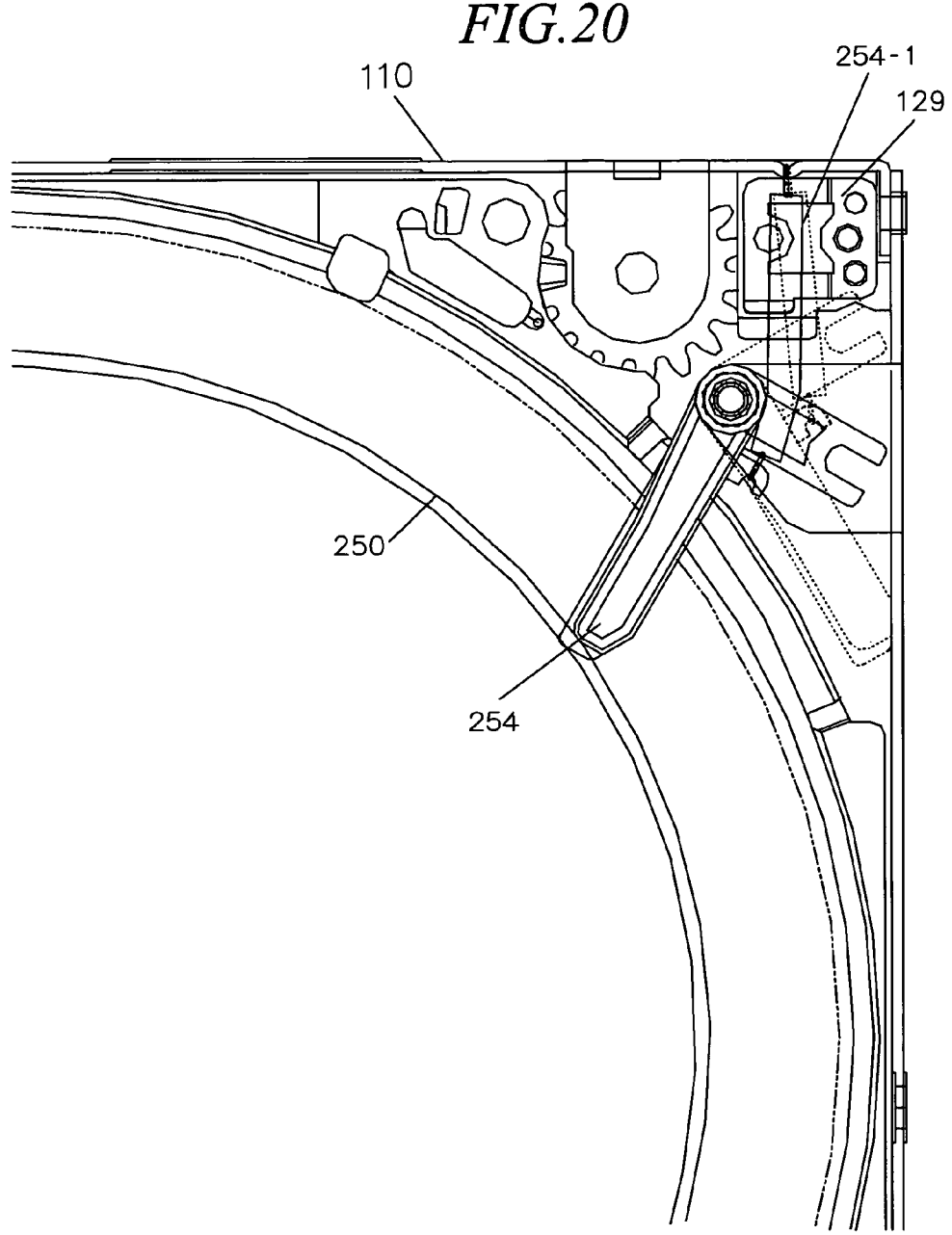
FIG. 20 is a plan view showing an ejecting arm of the disk device shown in FIG. 1.

As shown in FIG. 20, an ejecting arm 254 for biasing a disk D, which is an object of ejection, in an ejection direction is provided rotatably on the right rear side of the tray 250 of the pick chassis 110. The ejecting arm 254 is biased in a direction of withdrawing from the disk D by a spring 254-1 disposed between the ejecting arm 254 and the pick chassis 110. One end of a link plate 143 described hereinafter is connected rotatably to an end section of the ejecting arm 254.

[13. Drive Mechanism (FIGS. 21, 22)]

Figure 21:
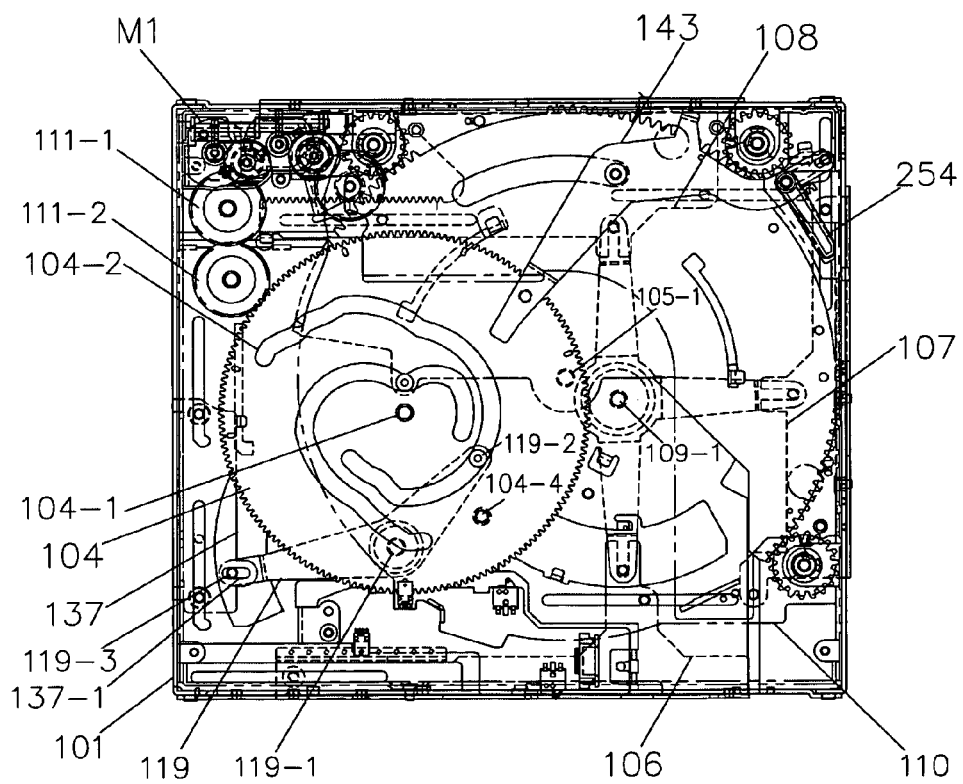
FIG. 21 is a perspective plan view showing a drive mechanism of the disk device shown in FIG. 1.
Figure 22:
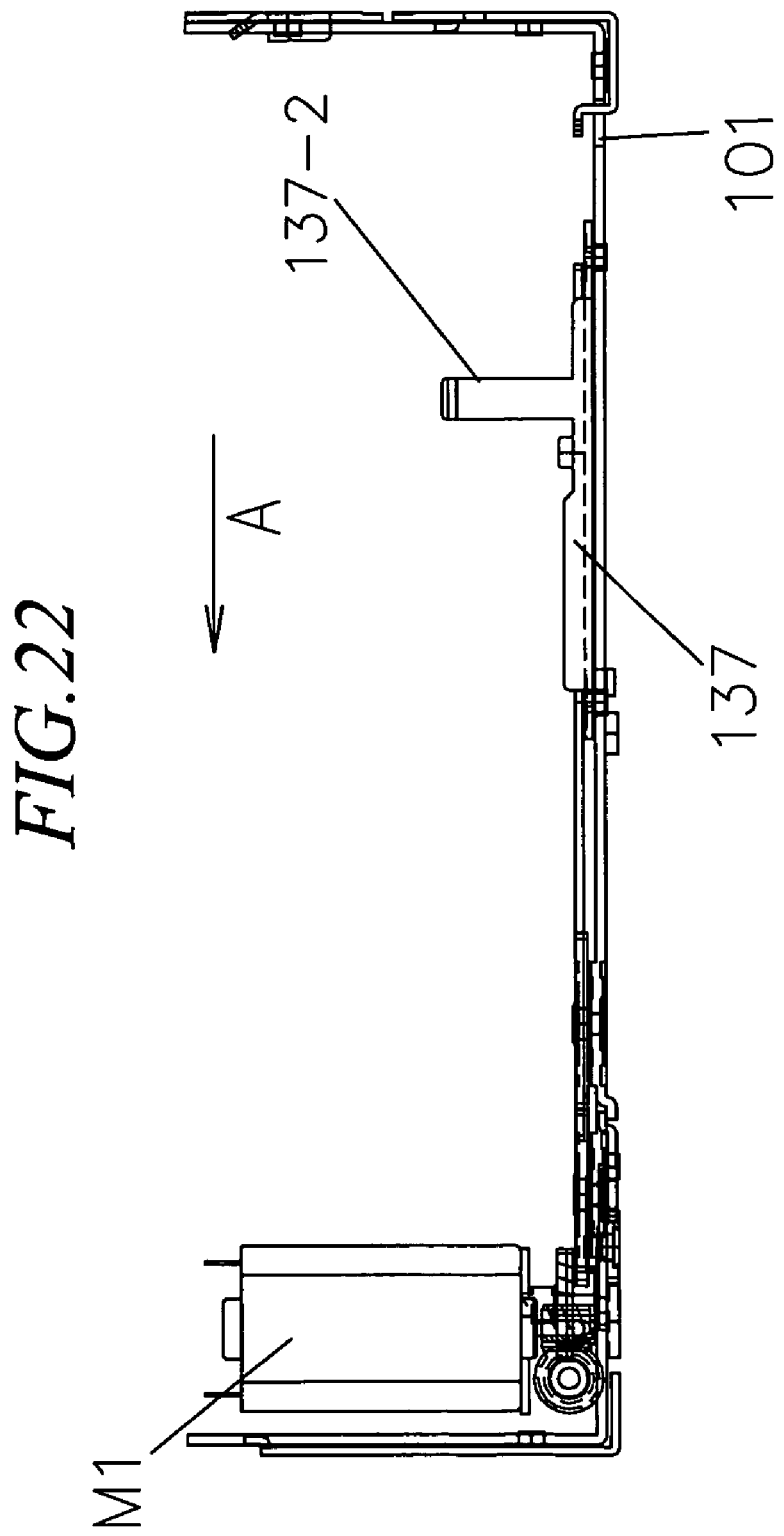
FIG. 22 is a left side view showing a slide plate of the disk device shown in FIG. 1.
Figure 23:
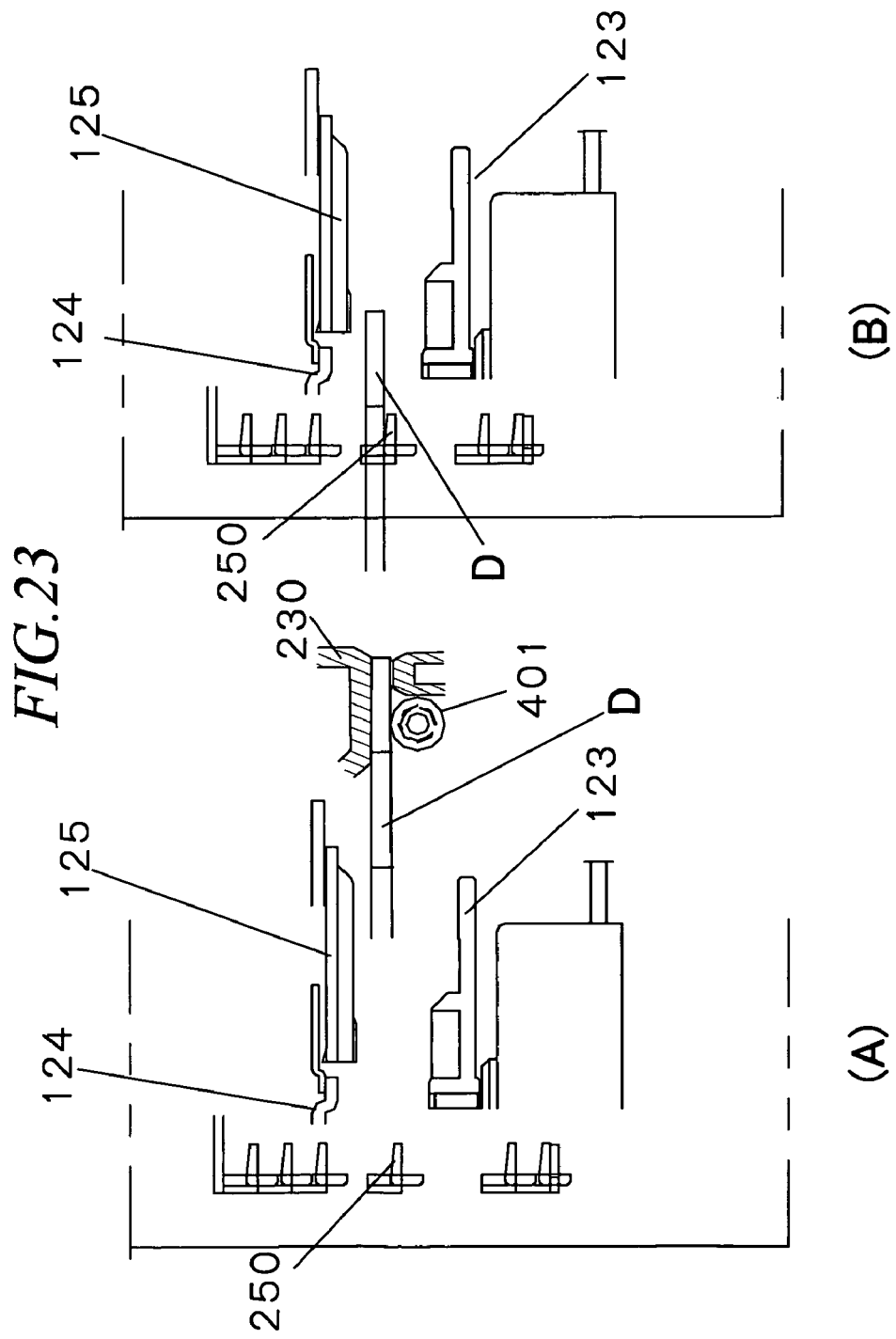
FIG. 23A is an explanatory diagram showing a state in which a disk starts to be inserted in the disk device shown in FIG. 1.
FIG. 23B is an explanatory diagram showing a state in which the disk is pulled out in the disk device shown in FIG. 1.

The abovementioned pick swing cam plate 138 can control the rotation of the regulating arm 231, rotation of the tension arm 115, rotation of the loading arm 256, and rotation of the pick arm 130, in accordance of the sliding movement thereof. As the drive mechanism for driving the pick swing cam plate 138, various known technologies can be applied. For example, as shown in FIG. 21 and FIG. 22, the following configuration is considered in which the pick swing cam plate 138 is slidingly moved by a combination of a motor M1, speed reduction mechanism, spur gears 111-1, 111-2, circular cam plate 104, link plate 119, and slide plate 137 provided in the chassis 101. Specifically, the motor M1 as a driving source is attached to a left side corner at the back of the chassis 101. The rotary drive power of the motor M1 is transmitted to the spur gears 111-1, 111-2 attached rotatably onto the chassis 101, via the speed reduction mechanism.

Further, the circular cam plate 104, outer periphery of which is formed with a gear groove, is attached to the bottom face of the chassis 101 so as to be able to rotate around the axis 104-1. A swing drive cam 104-2, which is a groove or a hole engaged with a roller 119-2 of the link plate 119, is formed on the circular cam plate 104, the roller 119-2 being described hereinafter. This link arm 119 is attached to an upper part of the bottom face of the chassis 101 so as to be rotatable around an axis 119-1. One end of the link arm 119 is provided with the roller 119-2 rotatably, and the other end is integrated with a pin 119-3. The roller 119-2 is inserted into the swing drive mechanism 104-2.

The slide plate 137 is provided on the left side face of the chassis 101 so as to be able to slidingly move back and forth. The pin 119-3 of the link arm 119 is connected to a connection hole 137-1 provided on the slide plate 137, so as to be able to rotate and move right and left. As shown in FIG. 22, the left side face of the slide plate 137 is provided with an abutting section 137-2 which is caused to stand vertically. This abutting section 137-2 abuts on the pick swing cam plate 138.

The swing drive cam 104-2 which is provided on the circular cam plate 104 is in the form of a continuous meander groove, and the roller 119-2 engaged therewith changes the distance to the axis 104-1 in accordance with rotation of the circular cam plate 104, whereby the link plate 119 is biased. Therefore, when the drive power of the motor M1 is transmitted to the circular cam plate 104 via the speed reduction mechanism and the spur gears 111-1, 111-2, the circular cam plate 104 rotates, at the same time the swing drive cam 104-2 moves, and accordingly the roller 119-2 is biased, whereby the link arm 119 rotates. Then, the slide plate 137 slidingly moves due to the rotation of the link plate 119, thus up-and-down movement of the pick swing cam plate 138 contacting with the abutting section 137-2 is permitted and the pick swing cam plate 138 slidingly moves back and forth.

Moreover, the circular cam plate 104 is provided with a boss 104-4 in a protruding fashion, and the link plate 143 is rotatably provided on the bottom face on the back side of the chassis 101. One end of the link plate 143 is connected rotatably to an end section of the ejecting arm 254. The other end of the link plate 143 rotates by being biased by the boss 104-4, in accordance with rotation of the circular cam plate 104. Specifically, when the boss 104-4 biases the abovementioned other end of the link plate 143 by means of the rotation of the circular cam plate 104, the ejecting arm 254 rotates clockwise against the bias force of the spring 254-1, along with the clockwise rotation of the link plate 143, whereby the disk D is biased in the ejection direction. It should be noted that, in response to an input signal from an operation button, sensor or the like, the motors M1, M3 are controlled by a microcomputer operated by a predetermined program.

C. Action

Regarding the above-described operation of the present embodiment, the overview of the operation of the disk device is described first and then a standby state, operations of carrying a disk, housing the disk, swinging and inserting the pick arm, playing the disk, swinging and ejecting the pick arm, and ejecting the disk are described sequentially.

[1. Overview of Operation (FIGS. 1, 2, 23,24)]

First, the overview of a flow of the operation of the disk device is described with reference. Specifically, as shown in FIG. 1, FIG. 23A and FIG. 23B, the disk D, which is inserted from the disk insertion opening 101-7, abuts on the guide section 256-4 of the loading arm 256 while being pulled into the device in accordance with rotation of the loading roller 401, whereby the direction of movement of the disk D is changed so that the disk D moves toward the tray 250, and at the same time the disk D is pressed against the tray 250 side by rotation of the loading arm 256, and thus is housed in a selected tray 250.

Then, at the time of playing the disk D, as shown in FIG. 2, FIG. 24A and FIG. 24B, the pick arm 130 is swung into the split tray 250 side, whereby the disk D which is placed on the turning table 123 of the drive chassis 120 is played. Thereafter, when ejecting the disk D, the pick arm 130 is swung out of the tray 250 and the ejecting arm 254 is rotated, whereby the disk D is pushed out from the tray 250. The disk D abuts on the guide section 256-4 of the loading arm 256, whereby the direction of movement of the disk D is changed so that the disk D moves toward the disk insertion opening 101-7. The disk D then abuts on the loading roller 401 and then is ejected from the disk insertion opening 107-1 to the outside in accordance with rotation of the loading roller 401.

[2. Standby State]

First, in the standby state, as shown in FIG. 18A, the pick swing cam plate 138 is positioned at the front. Therefore, the front bent section 113-3 of the link arm 113 is biased by the cam 138-2 of the pick swing cam plate 138, whereby the link arm 113 rotates counterclockwise. Accordingly, the biasing section 113-5 of the link arm 113 biases the left end of the shutter 103 to the right, thus the shutter 103 rotates upward to open the disk insertion opening 101-7 (see FIG. 19).

Further, at this moment, as shown in FIG. 16A, the leading end section 113-4 of the link arm 113 biases the slide link 114 to the right. Therefore, the lower pressing section 114-2 of the slide link 114 presses the lower protruding section 231-2 of the regulating arm 231 and the regulating arm 231 rotates in the direction in which the regulating section 231-A falls over, against the bias force of the spring 231-3, thus the disk D is withdrawn from the disk insertion opening 101-7. Furthermore, as shown in FIG. 9, the pin 115-3 of the tension arm 115 abuts on a protruding section on the left side of the pressing nib 114-3 of the slide link 114, and thus rotates against the bias force of the spring 115-2, and the pad 115-1 applies tension to the disk D (if already housed) below the disk insertion opening 101-7 so that the disk D does not come out of the tray 250.

On the other hand, as shown in FIG. 18A, the boss section 256-2 of the loading arm 256 abuts on the left side face 138-6 of the pick swing cam plate 138, and thus is rotated clockwise by the bias force of the spring 456. Therefore, the guide section 256-4 of the loading arm 256 is positioned on the tray 250 side. Moreover, the lifting section 138-7 of the pick swing cam plate 138 lifts up the clamp arm 124 from the bottom and thereby secures a clearance for inserting the disk between the turning table 123 and the clamper 125.

[3. Inserting the Disk]

In the above-described state, when the disk D is inserted into the disk insertion opening 101-7, the disk D is detected by a sensor (not shown) and the motor M3 is operated, thus the loading roller 401 rotates, whereby the disk D is pulled into between the loading roller 401 and the disk guide 230. As shown in FIG. 23A and FIG. 23B, the disk D passes through between the clamper 125 withdrawing upward and the turning table 123 therebelow. Then, as shown in FIG. 1, the disk D moves toward the back to abut on a guide section 134 of the loading arm 256, thereby changes the direction of the disk D, and is guided diagonally in the upper right direction when viewed two-dimensionally. Thereafter, the disk D separates from the loading roller 401, and the guide section 134 of the loading arm 256 pushes the disk D to the tray 250 side by means of the bias force of the spring 456, whereby the disk D is housed in the tray 250. When housing of the disk D is detected by the sensor, the loading roller 401 stops.

[4. Swinging and Inserting the Pick Arm]

Next, the operation of swinging the pick arm 130 into the split tray 250 side is described. Specifically, when the trays 250 above and below a selected tray 250 are split and withdrawn, the circular cam plate 104, which is rotated by the activation o the motor M1, rotates the ring gear 105 and moves the slide plate 137 backward, whereby the pick swing cam plate 138 starts to slidingly move backward. Consequently, as shown in FIG. 18B, the boss section 256-2 of the loading arm 256 is biased by the restricting section 138-4 of the pick swing cam plate 138 and the loading arm 256 rotates counterclockwise against the bias force of the spring 456, thus the guide section 256-4 of the loading arm withdraws from the disk D moving up and down when splitting the trays.

Simultaneously with the above operation, the bent section 113-3 of the link arm 113 is released from the cam 138-2 of the pick swing cam plate 138. Accordingly, bias against the slide link 114 by the leading end section 113-4 of the link arm 113 is canceled, and the slide link 114 is brought to the intermediate position by the bias force of the spring 414. Consequently, as shown in FIG. 15A and FIG. 15B, the pressing section 114-2 of the slide link 114 cancels the pressing action of the regulating arm 231 against the protruding section 231-2, thus the regulating arm 231 is rotated by the bias force of the spring 231-3 in a direction in which the regulating section 231-A stands upright, to prevent the disk D moving up and down when splitting the trays from coming out of the tray 250.

Moreover, as shown in FIG. 8, the pin 115-3 of the tension arm 115 abuts on a dent section at the center of the pressing nib 114-3 of the slide link 114, thus the pad 115-1 is caused to withdraw by the bias force of the spring 115-2 in a direction of separating from the disk D (moving up and down when splitting the trays) below the disk insertion opening 101-7.

In the above state, the trays 250 move up and down and the tray 250 housing a selected disk D is positioned. At this moment, in accordance with backward movement of the pick swing cam plate 138, the boss section 256-2 of the loading arm 256 is removed from the restricting section 138-4 and is brought to the left side face 138-6. Consequently, the loading arm 256 is rotated clockwise by the bias force of the spring 456, thus the edge of the selected disk D is held by the guide section 256-4 of the loading arm 256.

As shown in FIG. 7, the roller 131-2 of the pick swing arm 131 is biased by the swinging cam 138-1 during the backward sliding movement of the pick swing cam plate 138, thus the pick swing arm 131 rotates clockwise. The two-stage roller 131-3 of the pick swing arm 131 moves along the connecting cam 130-2 of the pick arm 130, thus the pick arm 130 rotates counterclockwise. Then, as shown in FIG. 2, the hook 130-5 at the leading end of the pick arm 130 is held by being inserted into the holding section 129 and then reaches a rotation end, the clamper 125 and the turning table 123 are brought to the top and bottom of the selected disk D.

[5. Playing the Disk]

The disk D is sandwiched by the clamper 125 and the turning table 123 brought in the manner described above, and floating lock is canceled to bring the drive chassis 120 into a floating state to cause the tray 250 to withdraw. Moreover, as shown in FIG. 18C, in accordance with the backward movement of the pick swing cam plate 138, the protruding section 256-3 of the loading arm 256 is biased by the restricting section 138-3, and the loading arm 256 rotate counterclockwise against the bias force of the spring 456, thus the guide section 256-4 of the loading arm 256 withdraws from the disk D which is an object of playing.

At this moment, the bent section 113-2 of the link arm 113 is biased by the cam 138-2 of the pick swing cam plate 138 and thereby rotates clockwise. Accordingly, the leading end section 113-4 of the link arm 113 biases the slide link 114 to the left. Therefore, as shown in FIG. 16B, the lower pressing section 114-2 of the slide link 114 presses the lower protruding section 231-2 of the regulating arm 231 and the regulating arm 231 rotates against the bias force of the spring 231-3 in a direction in which the regulating section 231-A falls down, thus the regulating arm 231 withdraws from the disk D to be played.

On the other hand, the pin 115-3 of the tension arm 115 is biased by a protruding section on the right side of the pressing nib 114-3 of the slide link 114, thus the edge of a disk D below the disk D to be played is held against the bias force of the spring 115-2 to prevent the disk D to come out of the tray 250. It should be noted that the biasing section 113-5 of the link arm 113 cancels bias on the shutter 103 and the shutter 103 rotates downward to close the disk insertion opening 101-7 by means of the bias force of the spring 103-4, whereby an erroneous insertion of the disk D is prevented.

Then, a signal of the disk D on the turning table 123 rotated by the spindle motor is read by an optical pick up. After playing of the disk is ended, the tray 250 moves upward to hold the disk D, and floating lock is carried out and the clamper 125 is released from the disk D. Furthermore, when the pick swing cam plate 138 is moved forward by the activation of the motor M1, the protruding section 256-3 of the loading arm 256 is removed from the restricting section 138-3 and is brought to the left side face 138-6. Consequently, the loading arm 256 is rotated clockwise by the bias force of the spring 456, thus the edge of the disk D is held by the guide section 256-4 of the loading arm after playing the disk D.

[6. Swinging and Ejecting the Pick Arm]

Moreover, when the pick swing cam plate 138 slidingly moves forward, the roller 131-2 is biased by the swinging cam 138-1 provided on the pick swing cam plate 138, the pick swing arm 131 rotates counterclockwise. The two-stage roller 131-3 of the pick swing arm 131 moves along the connecting cam 130-2 of the pick arm 130 and the pick arm rotates 130 clockwise. Accordingly, the hook 130-5 at the leading end of the pick arm 130 is removed from the holding section 129 and the clamper 125 the turning table 123 separate from the top and bottom of the disk D, and the pick chassis 110 returns to the initial position and is then stopped.

In the case where the played disk D is housed as it is, the selected tray 250 and the withdrawn tray 250 move in a direction of approaching each other and return to a housing state. When such trays 250 move up and down, the restricting section 138-4 of the pick swing cam plate 138 which slidingly moves forward biases the boss section 256-2 of the loading arm 256 as shown in FIG. 18B, thus the loading arm 256 rotates counterclockwise against the bias force of the spring 456. Therefore, the guide section 134 of the loading arm withdraws from the disk D moving up and down.

Further, the bent section 113-2 on the rear side of the link arm 113 is removed from the cam 138-2 of the pick swing cam plate 138 by forward movement of the pick swing cam plate 138. Accordingly, bias on the slide link 114 by the leading end section 113-4 of the link arm 113 is canceled and the slide link 114 is brought to the intermediate position by the bias force of the spring 414. Consequently, as shown in FIG. 15A and FIG. 15B, the pressing section 114-2 of the slide link 114 cancels the pressing action of the regulating arm 231 against the protruding section 231-2, thus the regulating arm 231 is rotated by the bias force of the spring 231-3 in a direction in which the regulating section 231-A stand upright, and prevent the disk D, which moves up and down, from coming out of the tray 250.

As shown in FIG. 8, since the pin 115-3 of the tension arm 115 abuts on the dent section at the center of the pressing nib 114-3 of the slide link 114, the pad 115-1 is caused to withdraw by the bias force of the spring 115-2 in a direction of separating from the disk D below the disk insertion opening 101-7, the disk D moving up and down. It should be noted that when the abovementioned stopped state is changed to the standby state (a state in which the disk D can be inserted/ejected), the pick swing cam plate 138 is caused to further move forward, as shown in FIG. 18A. Consequently, as described above, the shutter 103 opens the disk insertion opening 101-7, and the lifting section 138-7 of the pick swing cam plate 138 lifts up the clamp arm 124 from the bottom, whereby a clearance for inserting the disk is secured between the turning table 123 and the clamper 125.

[7. Ejecting the Disk]

In accordance with the forward movement of the pick swing cam plate 138, the front bent section 113-3 of the link arm 113 is biased by the camp 138-2 of the pick swing cam plate 138, whereby the link arm 113 rotates counterclockwise, as shown in FIG. 18A. Accordingly, the biasing section 113-5 of the link arm 113 biases the left end of the shutter 103 to the right, thus the shutter 103 rotates upward to open the disk insertion opening 101-7.

At this moment, as shown in FIG. 16A, the leading end section 113-4 of the link arm 113 abuts the slide link 114 to the right. Therefore, the lower pressing section 114-2 of the slide link 114 presses the lower protruding section 231-2 of the regulating arm 231, and the regulating arm 231 rotates against the bias force of the spring 231-3 in a direction in which the regulating section 231-A falls down, and withdraws from the disk insertion opening 101-7.

As shown in FIG. 9, since the pin 115-3 of the tension arm 115 abuts on the protruding section on the left side of the pressing nib 114-3 of the slide link 114, and thus rotates against the bias force of the spring 115-2, and the pad 115-1 applies tension to the disk D below the disk insertion opening 101-7 to prevent the disk D from coming out of the tray 250.

Furthermore, since the boss section 256-2 of the loading arm 256 abuts on the left side face 138-6 of the pick swing cam plate 138 and thus is rotated clockwise by the bias force of the spring 456. Therefore, the guide section 256-4 of the loading arm 256 is positioned on the tray 250 side.

In the above-described state, if an instruction for ejecting the disk D positioned at the disk insertion opening 101-7 is inputted, the motors M3, M1 are operated and the loading roller 401 rotates, and at the same time the ejecting arm 254 rotates to bias the disk D. The disk D, which is pushed out from the tray 250, abuts on the guide section 256-4 of the loading arm 256 and thereby changes the direction thereof. The disk D is then pushed into the loading roller 401 side by the bias force of the spring 456, and thus is guided to a lower direction when viewed two-dimensionally. Thereafter, the disk D is ejected from the disk insertion opening 101-7 by the rotating loading roller 401. Meanwhile, the disk D passes through between the clamper 125 withdrawing upward and the turning table 123 therebelow. When such ejection of the disk D is detected by the sensor, the loading roller 401 is stopped.

D. Effect

According to the present embodiment described above, the disk D, which has moved from the position of the disk insertion opening 101-7, abuts on the guide section 256-4 of the loading arm 256 and changes the direction thereof to the tray 250 side. At this moment, the loading arm 256 rotates, whereby the disk D is led to the tray 250 side and thus housed reliably in the tray 250. Especially, since the loading arm 256 is biased by the spring 456, thus the force for pushing into the tray 250 can be secured. The same is true for the case of biasing when the disk D is ejected. Furthermore, when playing the disk D, the loading arm 256 is rotated and the guide section 256-4 withdraws from the disk D, thus collision with the disk can be avoided.

The regulating arm 231, which is positioned at the regulating position, is in a state in which the regulating section 231-A stands upright and is slightly sway from the outer edge of the disk D (in the normal state where the disk D is housed completely) inside the tray 250. Therefore, the regulating arm 231 abuts on the outer edge of the disk D displaced from the tray 250 due to a vibration or the like, without interrupting the up-and-down movement of the disk D, and thereby prevents the disk D from coming out of the tray 250. Particularly, since the rod-like regulating section 231-A is caused to stand upright, the disk D can be prevented from coming out of the tray 250 with only a small space required, and even when the edge of the displaced disk D contacts with the regulating section 231-A at the regulating position, the recording surface is prevented from damage.

Moreover, in a state where the regulating section 231-A is slightly away from the edge of the disk D (in the normal state where the disk D is housed completely) housed inside the tray 250, the regulating arm 231 for regulating displacement of the disk D is combined with the tension arm 115 for abutting on the disk D housed in the tray 250 to regulate displacement of the disk D, whereby the disk D can be prevented from coming out of the tray 250 in various circumstances. Particularly, when the tray D moves up and down, the slide link 114 places the regulating arm 231 at the regulating position and the tension arm 115 at the withdrawing position, thus, while the up-and-down movement of the disk D is permitted, the outer edge of the disk D abuts on the regulating section 231-A when the disk D is displaced from the tray 250 due to a vibration or the like, whereby the disk D is prevented from coming out of the tray 250. On the other hand, when playing or inserting/ejecting the disk D, the link arm 113 places the regulating arm 231 at the withdrawing position and the tension arm 115 at the abutting position, thus a disk D, which is positioned below the disk D to be played or inserted/ejected, is prevented from coming out of the tray 250.

Since the pick arm 130, loading arm 256, regulating arm 231, and tension arm 115 can be appropriately driven by the pick swing cam plate 138 which is slidingly moved by the drive mechanism, the mechanisms around the tray 250 can be made extremely simple and a required space can be saved more significantly, compared to the case where members for driving the respective components are disposed.

Furthermore, the regulating arm 231 and the tension arm 115 are linked to each other by the link arm 113 and the slide link 114, and can be rotated in accordance with the sliding movement of the slide link 114. Therefore, although a large number of mechanisms are driven, the mechanisms can be further simplified and a required space can be saved.

Particularly, the pick swing cam plate 138 is a single plate, and the swinging cam 138-1, cam 138-2, restricting section 138-3, 138-4, and left side face 138-6, which are integrally formed on the pick swing cam plate 138, function as cams, whereby drive of a large number of members can be controlled. Accordingly, the number of members can be saved more, and the transfer pathway for the drive power can be simplified, thus failures and the like hardly occur in the operation of the disk device. Therefore, a disk device having high resistance to vibration can be configured.

The regulating arm 231 can be displaced by means of the slide link 114 and the link arm 113 in accordance with displacement of the pick swing cam plate 138 which drives the pick arm 130, thus the mechanisms can be made simple and a required space can be saved more, compared to the case where members for driving the respective components are disposed. Particularly, the slide link 114 can place the regulating arm 231 on the withdrawing position in both right and left ends of the slide link 114, thus, in a case where the pick swing cam plate 138 is moved in the forward/backward opposite direction when playing and inserting/ejecting the disk, the regulating arm 231 can be interlocked with the pick and swing cam plate 138 and driven.

Moreover, the regulating arm 231 and the tension arm 115 can be displaced by means of the slide link 114 and the link arm 113 in accordance with displacement of the pick swing cam plate 138 which drives the pick arm 130, thus the mechanisms can be made simple and a required space can be saved more, compared to the case where members for driving the respective components are disposed. Particularly, the slide link 114 can place the regulating arm 231 on the withdrawing position and the tension arm 115 on the abutting position in both right and left ends of the slide link 114, thus, in a case where the pick swing cam plate 138 is moved in the forward/backward opposite direction when playing and inserting/ejecting the disk, the regulating arm 231 and the tension arm 115 can be interlocked with the pick and swing cam plate 138 and driven.

E. Other Embodiment

The present invention is not limited to the embodiment described above. For example, the mechanism for moving the trays up and down, the drive mechanism for slidingly move the pick swing cam plate, and other mechanism are not limited to the ones described in the above embodiment. Moreover, each member, the number of members, positions for disposing the members, intervals between the members, distance between the operating members and the like are also arbitrary. For example, other embodiment may apply as long as the shape, position and the like of the cam provided on the pick swing cam plate play the abovementioned functions.

Furthermore, although the present invention is suitable for a disk device handling a CD, DVD, or the like, the present invention is not limited to this device, and thus can be applied widely to a flat recording medium. In addition, although the present invention is suitable for an on-board disk device since it has a small number of required spaces and is resistant to vibration, the present invention is not limited to this device, and thus can be applied to various disk devices of stand-alone type, portable type, and the like.

The invention claimed is:

1. A disk device, comprising:
   a swing arm which is provided with a drive unit for playing a disk and swung to insert the drive unit into a space created by splitting disk housing sections capable of housing a plurality of disks;
   and a drive mechanism for driving the swing arm, wherein the disk device further comprises:
   a loading arm which is capable of being displaced between a leading position for abutting on an edge of the disk moving between a disk insertion position and the disk housing sections and leading the disk to the disk housing section side or the disk insertion position, and a withdrawing position for withdrawing from the disk when the drive unit is not inserted into the disk housing sections; and
   a control member which transmits drive power of the drive mechanism to the swing arm, and is provided with loading arm driving means for driving, in accordance with the position thereof, the loading arm to the leading position or the withdrawing position.

2. The disk device according to claim 1, further comprising a biasing member for biasing the loading arm to the leading position.

3. The disk device according to claim 1, wherein the control member is a single plate provided so as to be able to slidingly move, and the loading arm driving means comprises a plurality of cams provided integrally on the control member.

4. The disk device according to claim 1, further comprising a regulating arm which is capable of being displaced between a regulating position, which is disposed between the disk housed in the disk housing section and the disk insertion position so as not to contact with the disk, and the withdrawing position for withdrawing from the disk housed in the disk housing section.

5. The disk device according to claim 4, further comprising a link mechanism which interlocks the control member and the regulating arm.

6. The disk device according to claim 5, wherein the link mechanism has a slide link which is provided so as to be able to slidingly move, and the slide link is provided with a pressing section which presses the regulating arm to the withdrawing position at both ends of the movement direction of the slide link.

7. The disk device according to claim 4, wherein the regulating arm comprises a rod-like regulating section which stands upright in the vicinity of the disk when located at the regulating position and falls over when located at the withdrawing position.

8. The disk device according to claim 1, further comprising a tension arm which is capable of being displaced between an abutting position for abutting on an edge of any of the disks other than the disks played or inserted/ejected, of the disks housed in the disk housing sections, and a withdrawing position for separating from the disk.

9. The disk device according to claim 1, further comprising:
   a regulating arm which is capable of being displaced between a regulating position, which is disposed between the disk housed in the disk housing section and the disk insertion position so as not to contact with the disk, and the withdrawing position for withdrawing from the disk housed in the disk housing section;
   a tension arm which is capable of being displaced between an abutting position for abutting on an edge of any of the disks other than the disks played or inserted/ejected, of the disks housed in the disk housing sections, and a withdrawing position for separating from the disk; and
   a link mechanism which places the tension arm at the withdrawing position when the regulating arm is located at the regulating position, and places the tension arm at the regulating position when the regulating arm is located at the withdrawing position.

10. The disk device according to claim 9, wherein the control member is capable of being interlocked with the link mechanism.

11. The disk device according to claim 9, wherein the link mechanism has a slide link which is provided so as to be able to slidingly move, and the slide link is provided with a pressing section which presses the regulating arm to the withdrawing position at both ends of the movement direction of the slide link, and is provided also with a biasing section which biases the tension arm to the regulating position.

12. The disk device according to claim 1, further comprising:
   a disk regulating section which is provided so as to be displaceable between a regulating position for regulating displacement of a disk housed in the disk housing section and a withdrawing position for withdrawing from the disk housed in the disk housing section; and
   wherein the control member comprises a regulating section biasing means for biasing the disk regulating section to the regulating position or the withdrawing position.

13. The disk device according to claim 12, wherein the disk regulating section comprises:
   a regulating arm which is capable of being displaced between a regulating position, which is disposed between a disk housed in the disk housing section and the disk insertion position, and a withdrawing position for withdrawing from the disk housed in the disk housing section;
   a tension arm which is capable of being displaced between an abutting position for abutting on any of disks housed in the disk housing sections and the withdrawing position for separating from the disks; and
   a link mechanism, which is provided so as to be driven by the regulating section biasing means, and interlocks the switching between the regulating position and the withdrawing position of the regulating arm, and the switching between the abutting position and the withdrawing position of the tension arm.

14. The disk device according to claim 12, wherein the control member is a single plate provided so as to be able to slidingly move.

15. The disk device according to claim 14, wherein each of the loading arm driving means and the regulating section biasing means comprises a plurality of cams provided integrally on the control member.

* * * * *